(12) United States Patent
Wilson et al.

(10) Patent No.: US 8,527,247 B1
(45) Date of Patent: Sep. 3, 2013

(54) NONLINEAR POWER FLOW FEEDBACK CONTROL FOR IMPROVED STABILITY AND PERFORMANCE OF AIRFOIL SECTIONS

(75) Inventors: David G. Wilson, Tijeras, NM (US); Rush D. Robinett, III, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 938 days.

(21) Appl. No.: 12/633,045

(22) Filed: Dec. 8, 2009

Related U.S. Application Data

(63) Continuation-in-part of application No. 12/052,180, filed on Mar. 20, 2008, now Pat. No. 8,121,708, and a continuation-in-part of application No. 12/474,349, filed on May 29, 2009, now abandoned.

(51) Int. Cl.
*G06F 17/50* (2006.01)
*G06F 7/60* (2006.01)
*G06G 7/48* (2006.01)
*G06G 7/50* (2006.01)
*B63H 3/00* (2006.01)

(52) U.S. Cl.
USPC ............... 703/9; 703/1; 703/2; 703/7; 416/36

(58) Field of Classification Search
None
See application file for complete search history.

(56) References Cited

U.S. PATENT DOCUMENTS

| | | | |
|---|---|---|---|
| 6,408,226 B1 | 6/2002 | Byrne | |
| 6,415,274 B1 | 7/2002 | Goldsmith | |
| 6,577,906 B1 | 6/2003 | Hurtado | |
| 6,826,431 B2 | 11/2004 | Hurtado | |

OTHER PUBLICATIONS

"The Benchmark Active Controls Technology Model Aerodynamic Data", Robert C. Scott, et al. Copyright © 1997 by the American Institute of Aeronautics and Aeronautics, Inc.*
"Computational Prediction of Airfoil Dynamic Stall", John A. Ekaterinaris, et al. 1998 Published by Elsevier Science Ltd.*
"Stability and Transition of Three-Dimensional Boundary Layers", William S. Saric, et al. 2003 by Annual Reviews.*
"Modeling physical uncertainties in dynamic stall induced fluid-structure interaction of turbine blades using arbitrary polynomial chaos", Jeroen A.S. Witteveen, et al. 2007 Elsevier Ltd.*
"Nonlinear aeroelastic behavior of an oscillating airfoil during stall-induced vibration", S. Sarkara, et al. 2008 Elsevier Ltd.*

(Continued)

*Primary Examiner* — Omar Fernandez Rivas
*Assistant Examiner* — Nithya J Moll
(74) *Attorney, Agent, or Firm* — Peacock Myers P.C.; Robert D. Watson; Olivia J. Tsai

(57) ABSTRACT

A computer-implemented method of determining the pitch stability of an airfoil system, comprising using a computer to numerically integrate a differential equation of motion that includes terms describing PID controller action. In one model, the differential equation characterizes the time-dependent response of the airfoil's pitch angle, $\alpha$. The computer model calculates limit-cycles of the model, which represent the stability boundaries of the airfoil system. Once the stability boundary is known, feedback control can be implemented, by using, for example, a PID controller to control a feedback actuator. The method allows the PID controller gain constants, $K_I$, $K_p$, and $K_d$, to be optimized. This permits operation closer to the stability boundaries, while preventing the physical apparatus from unintentionally crossing the stability boundaries. Operating closer to the stability boundaries permits greater power efficiencies to be extracted from the airfoil system.

17 Claims, 17 Drawing Sheets

(56) References Cited

OTHER PUBLICATIONS

"Implications of cubic physical/aerodynamic non-linearities on the character of the flutter instability boundary", Liviu Librescua et al. ? 2002 Elsevier Science Ltd.*
"Optimal Control of a Vortex Trapped by an Airfoil with a Cavity", Angelo Iollo et al. 2001 Kluwer Academic Publishers.*
Robinett, Rush D., et al., "What is a Limit Cycle", *Int'l Journal of Control*, vol. 81, No. 12, Dec. 2008.
Anthony, K. H., "Hamilton's Action Principle and Thermodynamics of irreversible Processes—A Unifying Procedure for Reversible and Irreversible Processes", *J. Non-Newtonian Fluid Mechanics*, vol. 96 2001, 291-339.
Hill, D. et al., "The Stability of Nonlinear Dissipative Systems", *IEEE Transactions on Automatic Control* Oct. 1976, 708-710.
Kokotovic, P. at al., "Constructive Nonlinear Control: A Historical Perspective", *Preprint submitted to Elsevier* Aug. 2000.
Kristic, M. et al., "Nonlinear and Adaptive Control Design", *John Wiley & Sons, Inc.*, New York 1985.
Moylan, P. J., "Implications of Passivity in a Class of Nonlinear Systems", *IEEE Transactions of Automatic Control*, vol. AC-19, No. 4, Aug. 1974, 373-381.
Ortega, R. et al., "Passivity-Based Control of Nonlinear systems: A Tutorial", *Proceedings of the American Control Conference*, Albuquerque, NM Jun. 1997, 2633-2637.
Robinett, Rush D, et al., "Exergy and Entropy Thermodynamic Concepts for Control Design: Slewing Single Axis", *2006 AIAA Guidance, Navigation, and Control Conference* Aug. 21, 2006.
Robinett, Rush D. et al., "Exergy and Entropy Thermodynamic Concepts for Nonlinear Control Design", *2006 ASME International Mechanical Engineering Congress & Exposition* Nov. 5, 2006.
Robinett, Rush D. et al., "Exergy and Irreversible Entropy Production Thermodynamic Concepts for Control Design: Nonlinear Regulator Systems", *The 8th IASTED International Conference on Control and Applications* May 2006.
Robinett, Rush D. et al., "Exergy and Irreversible Entropy Production Thermodynamic Concepts for Control System Design: Nonlinear Systems", *Proceedings of the 2006 14th Mediterranean Conference on Control and Automation* Jun. 2006, 1-8.
Robinett, Rush D. et al., "Exergy and Irreversible Entropy Production Thermodynamic Concepts for Control System Design: Regulators", *Proceedings of the 2006 IEEE International Conference on Control Applications* Oct. 2006, 2249-2256.
Robinett, Rush D. et al., "Exergy and Irreversible Entropy Production Thermodynamic Concepts for Control System Design: Robotic Servo Applications", *Proceedings of the 2006 IEEE International Conference on Robotics and Automation* May 2006, 3685-3692.
Robinett, Rush D. et al., "Exergy Sustainability", *Sandia Report SAND2006-2759* May 2006.
Robinett, Rush D. et al., "Exergy Sustainability for Complex SYstems", *InterJournal Complex Systems, 1616, New England Complex Systems Institute* Sep. 2006.
Slotine, J. E. et al., "Applied Nonlinear Control", *Prentice Hall, Inc.*, N.J. 1991.
Willems, J. C., "Dissipative Dynamical Systems Part I: General Theory; Part II; Linear Systems with Quadratic Supply Rates", *Archive for Rational Mechanics and Analysis*, vol. 45 1972, 321-393.
Wyatt, J. L. et al., "Energy Concepts in the State-Space Theory of Nonlinear n-Ports: Part I—Passivity", *IEEE Transactions on Circuits and Systems*, vol. CAS-28, No. 1 Jan. 1981, 48-61.
Wyatt, J. L. et al., "Energy Concets in the State-Space Theory of Nonlinear n-Ports: Part II—Losslessness", *IEEE Transactions on Circuits and Systems*, vol. CAS-29, No. 7 Jul. 1982, 417-430.
Boyce, W. E., et al., Elementary Differential Equations and Boundary Value Problems, 8th Edition, John Wiley and Sons, 2005. p. 450, Problem No. 7.
Carletti, T., et al., "A Note on Existence and Uniqueness of Limit Cycles for Lienard Systems", Journal of Mathematical Analysis and Applications, 307, (2005) 763-773.
Clark, R. L., et al., "Control of a Three-Degree-of-Freedom Airfoil with Limit-Cycle Behavior", Journal of Aircraft, vol. 37, No. 3, 2000, pp. 533-536.
Gopinath, A. K., et al., "Comparative Study of Computational Methods for Limit-Cycle Oscillations", 47th AIAA Structures, Structural Dynamics and Materials Conference, New Port, Rhode Island, May 2006.
Hall K. C., et al., "Computation of Unsteady Nonlinear Flows in Cascades Using a Harmonic Balance Technique", AIAA Journal, vol. 40, No. 5, May 2002, pp. 879-886.
Ko, J., et al., "Nonlinear Control of a Prototypical Wing Section with Torsional Nonlinearity", Journal of Guidance, Control, and Dynamics, vol. 20, No. 6, Nov.-Dec. 1997, pp. 1181-1189.
Lee, B. H., et al., "Flutter of an Airfoil with a Cubic Nonlinear Restoring Force". AIAA-98-1725. (1998).
Price, S. K., et al., "Postinstability Behavior of a Two-Dimensional Airfoil with a Structural Nonlinearity", Journal of Aircraft, vol. 31, No. 6, Nov.-Dec. 1994, pp. 1395-1401.
Robinett, R. D. III, et al., "Collective Systems: Physical and Information Exergies", Sandia National Laboratories, SAND2007-2327, Apr. 2007.
Sabitini, M., "Limit Cycle's Uniqueness for a Class of Plane Systems", Technical Report, UTM 662, Mathematica, Univ. of Trento, Italy, Feb. 2004.

\* cited by examiner $$H = 0.5*I*\alpha\,dot^2 + 0.5*k*\alpha^2 + 0.25*k_{NL}\alpha^4$$

$$H = 0.5*I*\alpha\,dot^2 + 0.5*k*\alpha^2 + 0.25*k_{NL}\,\alpha^4$$

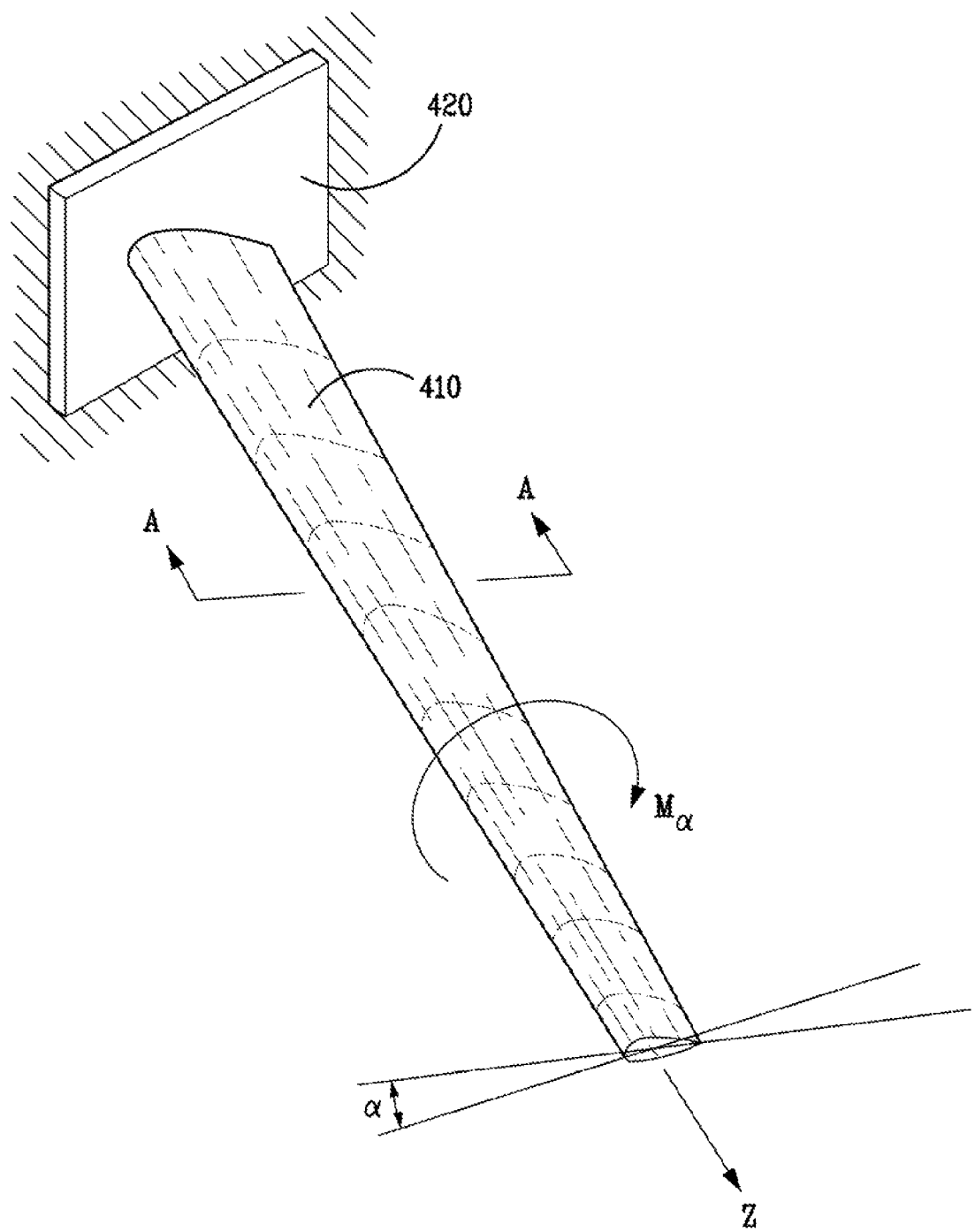
FIG. 14-A

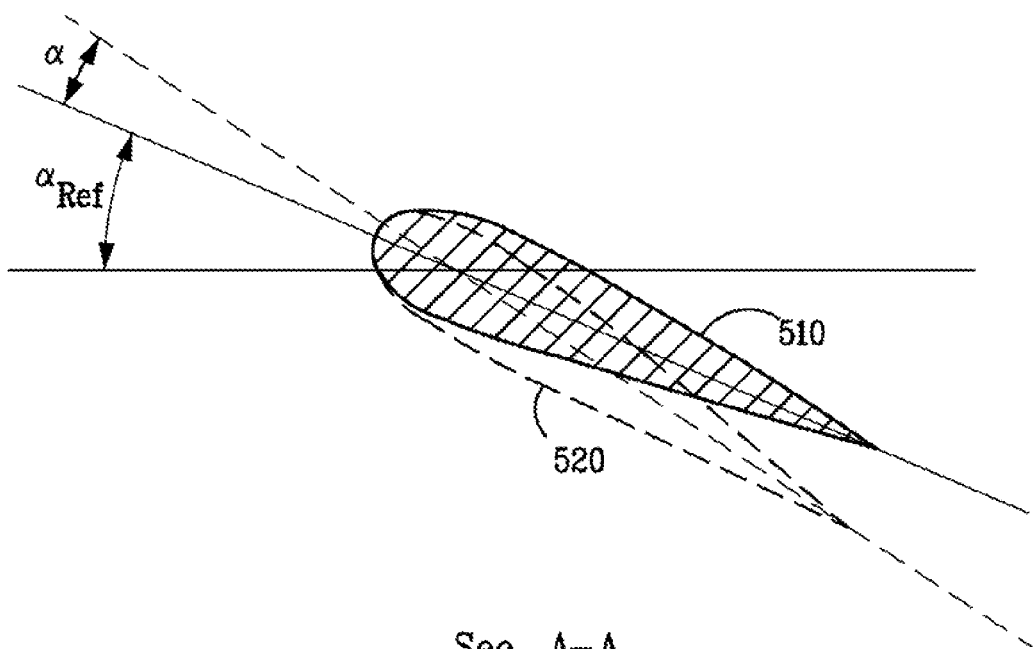
Sec. A-A
FIG. 14-B

NONLINEAR POWER FLOW FEEDBACK CONTROL FOR IMPROVED STABILITY AND PERFORMANCE OF AIRFOIL SECTIONS

CROSS-REFERENCE TO RELATED APPLICATIONS

This application is a Continuation-in-Part application of patent application Ser. No. 12/052,180 filed Mar. 20, 2008 now U.S. Pat. No. 8,121,708, Exergy and Irreversible Entropy Production Thermodynamic Concepts for Control Systems Design, by R. D. Robinett III and D. G. Wilson. This application is also a Continuation-in-Part application of patent application Ser. No. 12/474,349 filed May 29, 2009 now abandoned, Nonlinear/Adaptive Power Flow Control Applied to Power Engineering, by R. D. Robinett III and D. G. Wilson.

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

BACKGROUND OF THE INVENTION

The present invention relates to methods and apparatus for controlling dynamic physical systems comprising airfoils (e.g., planes, wind turbines, helicopters). Examples of airfoils include: fixed airplane wings, moving blades of a propeller, rotor or turbine; wind turbine blades; helicopter rotor blades; gas turbine blades; water turbine blades; wings on high-performance automobiles; hydrofoils; airfoil-shaped submarine periscopes; airfoil-shaped exhaust stacks; sails on sailing ships; and power lines. More generally, the present invention relates to analysis and control of dynamic systems comprising any dynamic physical system characterized by a discontinuous hysteresis function, including highly-discontinuous functions (i.e., having greater than two discontinuities).

Researchers have been investigating limit cycle behavior for many different engineering fields. Specific applications that relate to the category of time-periodic systems include, for example, helicopter blades in forward flight, wind turbine blades generating electricity, and airplane wing flutter, all of which Limit-Cycle Oscillations (LCO's) may become present. The prediction and control of LCO behavior in a system continues to be a challenge and an on-going area of research. A limit-cycle on a plane or a two-dimensional manifold is a closed trajectory in phase space having the property that at least one other trajectory spirals into it either as time approaches infinity, or as time approaches minus-infinity. Such behavior is exhibited in some nonlinear systems.

Several researchers are investigating cyclic methods to compute limit-cycle oscillations for potentially large, nonlinear systems of equations. For example, a harmonic balance technique can be used for modeling unsteady nonlinear flows in turbomachinery. Here, a transonic front stage rotor of a high-pressure compressor was found to flutter in torsion, but reached a stable limit cycle; demonstrating that strongly nonlinear flows can be modeled accurately with a small number of harmonics.

Our goal was to determine the range of applicability of models of varying fidelity to the numerical prediction of wing flutter LCOs, and related evaluations. A simple 1-DOF aeroelastic model of an airfoil with nonlinear structural coupling was used to demonstrate the efficacy of the general procedure.

In particular, with respect to large wind turbine systems (0.5-5 MW rated power) the dynamic stability limits of the individual blades, and of the entire assembly of 3-blades/Hub/housing/tower, are not well known. It is difficult and expensive to test a full-sized blade under the high wind loads (e.g., greater than 12 m/s) needed to induce dynamic stall, flutter, and/or instability. Because the limits of stability are not well known, existing large wind turbine farms operate conservatively, with a considerable margin of safety (both in terms of max wind speed and fatigue lifetime) as part of smart rotor technology as applied to wind turbines and rotorcraft. As the need for electric power increases, electric utilities will be pushed to operate the blades closer and closer to their stability limits to increase efficiency and extend lifetimes.

BRIEF SUMMARY OF THE INVENTION

A computer-implemented method of determining the pitch stability of an airfoil system, comprising using a computer to numerically integrate a differential equation of motion that includes terms describing PID controller action. In one model, the differential equation characterizes the time-dependent response of the airfoil's pitch angle, $\alpha$. The computer model calculates limit-cycles of the model, which represent the stability boundaries of the airfoil system. Once the stability boundary is known, feedback control can be implemented, by using, for example, a PID controller to control a feedback actuator. The method allows the PID controller gain constants, $K_I$, $K_p$, and $K_d$, to be optimized. This permits operation closer to the stability boundaries, while preventing the physical apparatus from unintentionally crossing the stability boundaries. Operating closer to the stability boundaries permits greater power efficiencies to be extracted from the airfoil system.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 14-A shows an isometric view of a wind turbine blade.

FIG. 14-B shows a cross-section view through a wind turbine blade.

DETAILED DESCRIPTION OF THE INVENTION

Figure 1:
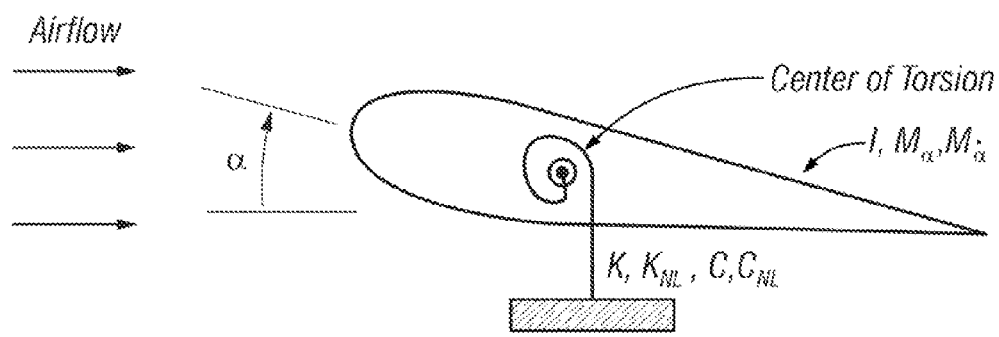
FIG. 1 is an illustration of the nonlinear flutter model employed to test the invention.

The present invention is of an apparatus, computer software, and method of use that applies a novel, nonlinear power flow control (NLPFC) technique to better understand the problem of nonlinear stall flutter and, more generally, to understanding dynamic physical systems characterized by one or more nonlinear hysteresis functions. The nonlinear hysteresis function can have one or more discontinuities. The nonlinear hysteresis function may be simply discontinuous (one discontinuity), or highly-discontinuous (having more than one discontinuity). Examples of discontinuities include large changes in the slope of the curve, step-changes in the values of the function, and singularities. Examples of mechanical systems that have discontinuous hysteresis functions include: airfoil stall behavior (zero lift when $|\alpha| > \alpha_{stall}$); propellors under water experiencing cavitation (change in fluid phase from liquid to gas) and losing thrust; mechanical contact between moving parts (with or without friction), such as backlash between gears.

We define "pitch stability" as the tendency of an airfoil structure or system to return to its equilibrium stable (i.e., trimmed) state after a disturbance has been introduced. An airfoil structure can be passively stable (whereas no external intervention is required to return the disturbed state back to equilibrium); or actively stablized (wherein an active feedback control system is used to monitor the deviations from equilibrium, and then to apply a negative force or moment to force the structure back towards its equilibrium state). We define an "airfoil" as any shaped surface, such as an airplane wing, tail, or propeller blade, that produces lift and drag when moved through the air (or other fluid, such as water). An airfoil produces a lifting force that acts at right angles to the airstream, and a dragging force that acts in the same direction as the airstream. Our definition of "airfoil" includes all fluids, including air and water. Airfoils generally have an aerodynamic cross-section, such as a wing, that creates more lift than drag. Airfoils typically have a teardrop shape.

As an example, a one-degree of freedom (1-DOF) nonlinear aerodynamic and structural model of the rotational response (pitch angle) of an airfoil section. The behavior of this 1-DOF model is closely related to the first torsional (twisting) mode of a large wind turbine blade (e.g., 1.5 MW rated power).

This 1-DOF model was analyzed using the novel nonlinear power flow control (NLPFC) technique to determine the limit cycle behavior of the nonlinear stall flutter condition of the first torsional mode. Also, this model was further analyzed using the NLPFC technique to determine the effectiveness of using a PID-type feedback control mechanism to suppress nonlinear flutter. Analysis of this simplified airfoil model demonstrated that, indeed, the calculated limit cycle did define a stability boundary.

The advanced NLPFC technique described herein incorporates dynamic stall flutter identification (ID) feature, which will be an important component of future Intelligent Control system, i.e., systems comprising smart structures (e.g., morphing wings) and embedded sensors or actuators (e.g., microtabs or trailing edge flaps, and embedded piezoceramic actuator patches).

Economically, there is great value in being able to identify and operate large wind turbines (1-5 MW) more closely to their stability boundaries than has been done before. The closer to dynamic stall that the wind turbine can safely operate, the greater the power it can generate. Other potential benefits to the turbine designer include: increased effective rotor size; increased life expectancy and reliability; and reduced Cost-of-Energy (COE).

The present invention progresses the art by recognizing that limit cycles are the stability boundaries for linear and nonlinear control systems. The Poincaré-Bendixson Theorem is a good place to start. Boyce and DiPrima (See W. E. Boyce and R. C. DiPrima, *Elementary Differential Equations and Boundary Value Problems*, $8^{th}$ Ed., John Wiley and Sons, 2005) provide some insight into the proof of this theorem, in the form of Green's Theorem applied to a line integral over a closed curve that equals zero or $$\dot{x} = F(x, y), \dot{y} = G(x, y) \quad (1)$$

$$\oint_c [F(x, y)dy - G(x, y)dx] = \int \int_R [F_x(x, y) + G_y(x, y)]dA = 0$$

This line integral was modified for Hamiltonian systems to determine the limit cycles resulting from power flow control. In particular, the work-per-cycle, $W_{cyclic}$, as defined by the line integral of the power flow:

$$W_{cyclic} = \oint_\tau F \cdot \dot{x} dt = 0 \quad (2)$$

is the modified form of choice, since the time derivative of the Hamiltonian is the generalized power flow for natural systems. When the work-per-cycle, $W_{cyclic}$, equals zero, the energy dissipated within the system equals the energy generated, and a limit-cycle is produced. (See R. D. Robinett III and D. G. Wilson, *Exergy and Entropy Thermodynamic Concepts for Control System Design: Slewing Single Axis*, AIAA Guidance, Navigation, and Control Conference and Exhibit, Keystone, Colo., August 2006).

As a mechanical example of limit cycle behavior, classical flutter is a linear limit cycle that is a result of the superposition of a bending mode and a torsional mode to produce a self-excited oscillation. During flutter, negative work is done on the wing by: 1) part of the torsional motion, 2) by the flexural motion, and 3) by the elastic restoring forces; whereas positive work is done on the wing by part of the torsional motion. The motion will maintain itself (the condition for flutter) when the net positive work just balances the dissipation of energy due to all the damping forces. The magnitude of the positive work done by the additional lift due to the twist is directly dependent upon the phase relationship between the coupled torsional and flexural modes.

The present invention relies on the existence of limit cycles, which are based on power flows that leads to a balance between positive work and energy dissipation due to damping. This approach is generalized to nonlinear systems with nonlinear limit cycles, where power flows are balanced over a cycle (in contrast to point-by-point cancellation for linear systems).

The present invention demonstrates that limit cycle behavior occurs at the stability boundaries for linear and nonlinear systems, which leads to necessary and sufficient conditions for stability of nonlinear systems. Power flow and energy arguments are used to define the existence of limit cycles and the stability of the system. The discussion begins with linear systems, which are then extended to nonlinear systems, and finally applied to a large class of plane differential systems by modifying the results of Sabatini. The necessary and sufficient conditions are defined by an extension of eigenanalysis of linear systems to nonlinear systems, and is referred to as "the power flow principle of stability for nonlinear systems." (See R. D. Robinett III and D. G. Wilson, *Collective Systems: Physical and Information Exergies*, Sandia National Laboratories, SAND2007-2327, April 2007). The stability analysis and controller design of the present invention are based on the classic "static and dynamic stability" of flight stability of airplanes. The present Hamiltonian-based power flow control methodology provides a natural decomposition into static stability and dynamic stability analysis and design procedures.

In the next section, we introduce a 1-DOF nonlinear stall flutter model, discuss other nonlinearites, and describe the design and analysis of a PID (Proportional-Integral-Derivitive) type feedback controller, based on our novel power flow control concepts.

A proportional-integral-derivative controller (PID controller) is a generic control loop feedback mechanism (controller) widely used in industrial control systems. The PID controller attempts to correct the error between a measured process variable and a desired setpoint by calculating, and then instigating, a corrective action that can adjust the process accordingly and rapidly, to keep the error minimal. The PID controller calculation (algorithm) involves three separate parameters: 1) the proportional, 2) the integral, and 3) the derivative values (gains). The proportional value, $K_p$, determines the reaction to the current error. The integral value, $K_I$, determines the reaction based on the sum of recent errors. Finally, the derivative value, $K_D$, determines the reaction based on the rate at which the error has been changing. The weighted sum of these three actions (i.e., weighted by the three gain constants) is used to adjust the process via an active control element, such as using an actuator to change the position of a control valve (or airfoil pitch angle), or adjusting the power supply of a heating element. By "tuning" the three gain constants ($K_I$, $K_p$, $K_D$) in the PID controller algorithm, the controller can provide improved control action designed for specific process requirements. The response of the controller can be described in terms of the responsiveness of the controller to an error, the degree to which the controller overshoots the setpoint, and the degree of system oscillation.

Note that the use of the PID algorithm for control does not guarantee optimal control of the system or system stability. Other algorithms, different than the PID type, can be used in the instant application.

Some applications may require using only one or two modes to provide adequate system control. This is achieved by setting the gain of the unneeded control outputs to zero. Hence, a PID controller can be called a PI, PD, P, or I controller, in the absence of the respective control actions. PI controllers are particularly common, (especially when speed or rate is the feedback signal), since derivative action is very sensitive to measurement noise, and the absence of an integral value may prevent the system from reaching its target value due to the control action.

The present nonlinear power flow control technique allows the nonlinear dynamical system to be partitioned into three categories: generation, dissipation, and storage. By identifying the power flow over a cycle, the system stability and performance characteristics can then be determined. Further details using this technique are outlined in R. D. Robinett III and D. G. Wilson, *Exergy and Irreversible Entropy Production Thermodynamic Concepts for Nonlinear Control Design*, International Journal of Exergy, Vol. 6, No. 3, 2009, pp. 357-387; and R. D. Robinett III and D. G. Wilson, *What is a Limit Cycle?*, International Journal of Control, Vol. 81, No. 12, December 2008, pp. 1886-1900.

Next, we apply the NLPFC technique to analyze the time-dependent behavior, and stability limits, of a 1 Degree-of-Freedom model of an airfoil section experiencing dynamic stall conditions.

1-DOF Nonlinear Stall Flutter Model.

This section develops a single Degree-Of-Freedom (DOF) model of the pitch stability of an airfoil section. The model can be used to simulate experimental results, such as from a wind tunnel test of an airfoil segment, or scale model of an entire wing or plane. The single degree of freedom modelled is the angle of attack of an airfoil structure measured relative to the direction of the incoming fluid flow (wind or water in this simplified model, the torsional twisting of the blade or wing is not considered. Since the orientation of the airfoil relative to the ground is not considered here, we define the pitch angle, $\alpha$, to be the same as the angle-of-attack.

FIG. 1 depicts the simplified physical model of the airfoil system, where: $\alpha$ is the angle of attack (pitch angle) of the airfoil with respect to the direction of incoming fluid (wind or other fluid); K is a (linear) torsional stiffness; $K_{NL}$ is a nonlinear torsional stiffness; C is a (linear) torsional damping; $C_{NL}$ is a nonlinear torsional damping; I is the airfoil section's rotational moment of inertia about the Z-axis, and $M_\alpha$, M are the aerodynamic loads (moments) applied to the airfoil by the incoming wind (or water). Single "dots" over a variable represent the first derivative with respect to time of that variable, and double "dots" over a variable represent the second derivative with respect to time. As will be shown later, the dynamic response of this simple 1-DOF model exhibits nonlinear, dynamic stall/flutter behavior over its entire flight envelope.

Figure 13:
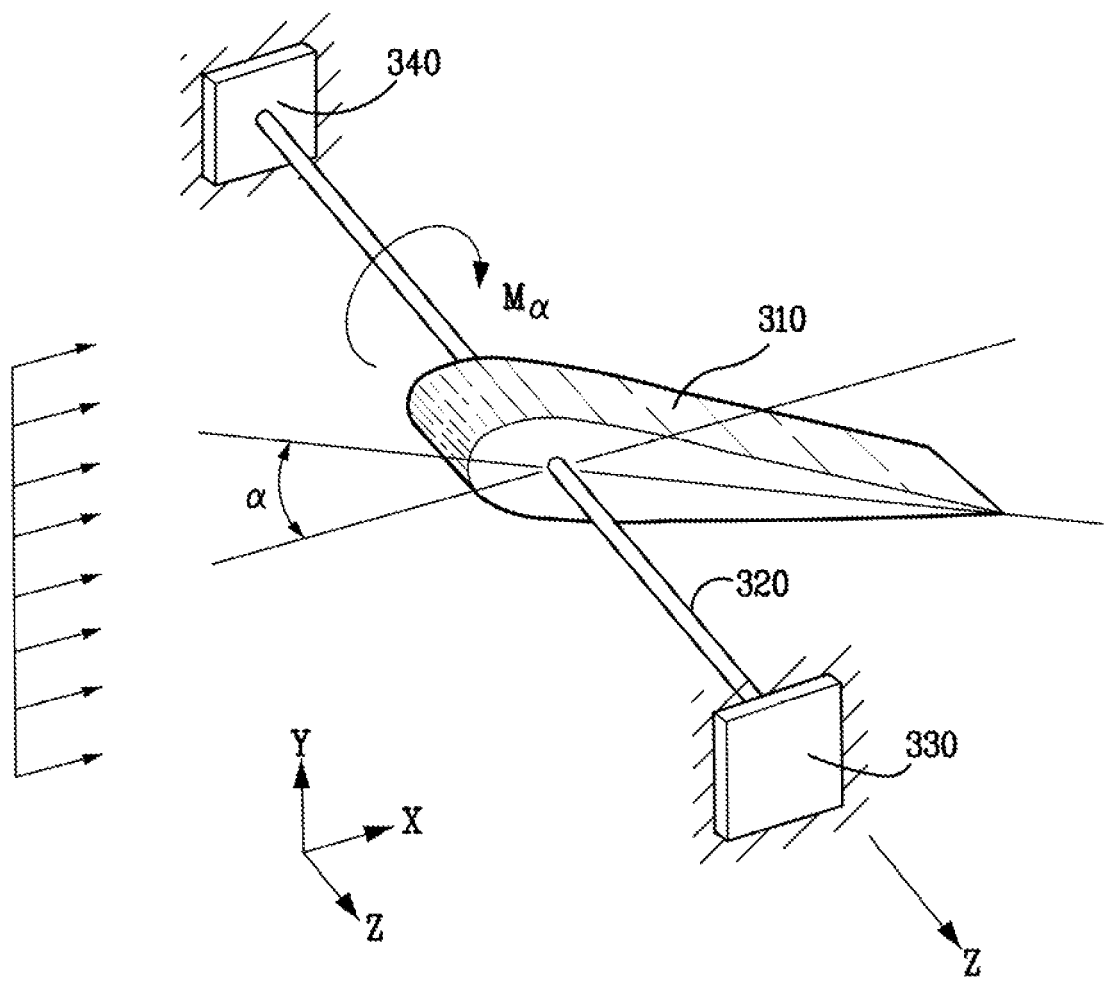
FIG. 13 shows an isometric view of a 1-DOF airfoil model.

The spring constant, K, can be chosen to represent a variety of different physical configurations. For example, FIG. 13 shows an airfoil section 310 with length=L, supported with a rod 320 passing through the airfoil's center of gravity, rigidly mounted to fixed plates 330 and 340. In our 1-DOF model above, airfoil 310 is treated as a rigid body (i.e., L<chord length) that can rotate about the Z-axis through rotation angle $\alpha$, but without any twisting or torsion of the airfoil section itself. The airfoil's rotation (forced by aerodynamic moment, $M_\alpha$) is resisted by the torsional spring resistance, K, of rod support 320. Note: FIG. 13 is an isometric view of the airfoil shown in FIG. 1.

Alternatively, as shown in FIG. 14-A, the airfoil 410 can represent the long wing of a high-performance glider, or the long blade of a power generating wind turbine. Airfoil 410 can have one end rigidly fixed to plate 420. As the aerodynamic moment $M_\alpha$ is applied, blade 410 twists in torsion about its long axis. Note: $\alpha$ is a function of position, z, along the blade. The spring constant, K, represents the torsional modulus of elasticity of the blade or wing twisting about its longitudinal axis. In FIG. 14-B we define a reference angle-of-attack, $\alpha_{ref}$, which is the reference (setpoint) nominal operating angle of an airfoil (e.g., a wind turbine blade) relative to the incoming wind. Then, depending on wind gusts, or sudden changes in wind direction, the local blade angle, $\alpha$, oscillates +/− about this reference angle, $\alpha_{ref}$.

Figure 2:
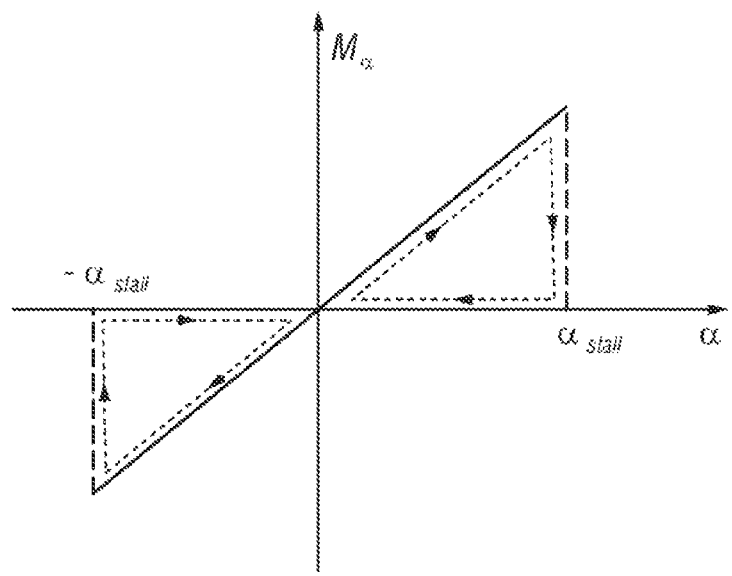
FIG. 2 illustrates the nonlinear hysteresis aerodynamic moment characteristic of the model.

The 1-DOF equation of motion for the dynamic response (behavior) of the pitch angle $\alpha$ is derived from Lagrange's equation:

$$\frac{d}{dt}\left(\frac{\partial L}{\partial \dot{\alpha}}\right) - \frac{\partial L}{\partial \alpha} = Q_\alpha \tag{3}$$

where $$L = T - V$$

$$T = \frac{1}{2}I\dot{\alpha}^2$$

$$V = \frac{1}{2}K\alpha^2 + \frac{1}{4}K_{NL}\alpha^4$$

$$Q_\alpha = Q_{damp} + Q_{aero} + Q_{control}$$

$$Q_{damp} = -C\dot{\alpha} - C_{NL}\text{sign}(\dot{\alpha})$$

$$Q_{aero} = M_\alpha(\alpha) + M_{\dot{\alpha}}(\dot{\alpha}, \alpha) \text{ and}$$

$$Q_{control} = u = -K_P\alpha - K_I\int_0^t \alpha\, d\tau - K_D\dot{\alpha}$$

where L is the Lagrangian; T the kinetic energy; V the potential energy; and $Q_\alpha$ the generalized forces/moments. The feedback controller input $\mu$ consists of Proportional-Integral-Derivative (PID) control action, where $K_P$ is the proportional gain, $K_I$ the integral gain, and $K_D$ the derivative gain. The externally applied aerodynamic moments $M_\alpha$ and M are modelled using the following nonlinear hysteresis model (see FIG. 2). The model for $M_\alpha$ is highly-discontinuous because it has 2 discontinuities with steep slopes (effectively infinite slope), while the model for M is simply discontinuous because it has only one discontinuity.

$$M_\alpha(\alpha) = \begin{cases} \hat{C}_{M_\alpha}\alpha & \text{for} \quad |\alpha| < \alpha_{stall} \\ 0 & \text{for} \quad |\alpha| > \alpha_{stall} \\ 0 & \text{for} \quad thereturnhysteresiscycle \end{cases}$$

and $$M_{\dot{\alpha}}(\dot{\alpha}, \alpha) = \begin{cases} \hat{C}_{M_{\dot{\alpha}}}\dot{\alpha} & \text{for} \quad |\alpha| < \alpha_{stall} \\ 0 & \text{for} \quad |\alpha| > \alpha_{stall} \end{cases}$$

Substituting these into eq. (3) yields the following 1-DOF non-linear differential equation of motion:

$$I\ddot{\alpha} + K\alpha + K_{NL}\alpha^3 = -C\dot{\alpha} - C_{NL}\text{ sign }(\dot{\alpha}) + \mu + M_\alpha(\alpha) + M(\dot{\alpha},\alpha) \tag{4}$$

Linear Region (No Feedback Control).

For $|\alpha| < \alpha_{stall}$, the model is linear with $K_{NL} = C_{NL} = 0$. In this case, Eq. (4) simplifies to:

$$I\ddot{\alpha} + [C - \hat{C}_M]\dot{\alpha} + [K - \hat{C}_{M_\alpha}]\alpha = \mu \tag{5}$$

Eq. (5) is a typical second-order ordinary linear differential equation (ODE) that, when numerically integrated by a computer for the pitch angle, alpha, as a function of time, $\alpha(t)$, produces typical linear aeroelastic behavior. The numerical integration can use standard packages, such as Matlab™/Simulink™ packages by MathWorks, Inc. These packages often use fixed time-step Runge-Kutta $4^{th}$ numerical integration techniques. Divergence occurs when:

$$\hat{C}_{M_\alpha} \geq K \text{ for } \mu = 0 \tag{6}$$

where $$\hat{C}_{M_\alpha} = K_{M_\alpha}qA = K_{M_\alpha}A\left(\frac{1}{2}\rho V^2\right). \tag{7}$$

In eq. (7), V is the wind velocity, A the cross-section area of the airfoil section facing into the wind, and $\rho$ is the density of air.

Torsional flutter occurs when:

$$\hat{C}_M \geq C \text{ for } K - \hat{C}_{M_\alpha} > 0 \text{ and } \mu = 0 \tag{8}$$

where $$\hat{C}_M = K_M qAd. \tag{9}$$

Here, q=dynamic pressure, A=cross-section area, d=reference length (typically chord length).

Nonlinear Stall Flutter with Linear Dynamics (No Feedback Control).

Next, when the pitch angle reaches $|\alpha| > \alpha_{stall}$, the model becomes nonlinear. In this case, eq. (5) becomes:

$$I\ddot{\alpha} + C\dot{\alpha} + K\alpha = M_\alpha(\alpha) + M(\dot{\alpha},\alpha) \tag{10}$$

with the Hamiltonian terms, H and $\dot{H}$, being given by:

$$H = \frac{1}{2}I\dot{\alpha}^2 + \frac{1}{2}K\alpha^2 \tag{11}$$

$$\dot{H} = [I\ddot{\alpha} + K\alpha]\dot{\alpha} = [-C\dot{\alpha} + M_\alpha(\alpha) + M_{\dot{\alpha}}(\dot{\alpha},\alpha)]\dot{\alpha} \tag{12}$$

The left hand side of eq (12) represents energy storage in elastic (spring) elements of the model, which don't change during a stable limit-cycle. The right hand side of eq. (12) is the difference between dissipative and generative parts of the model. When $\dot{H} < 0$, the mechanical system dissipates more energy than it generates during a single cycle, and the net energy decreases from cycle to cycle. This results in damped behavior of the pitch angle. When $\dot{H} = 0$, the mechanical system dissipates the same amount of energy that it generates during a single cycle, and the net energy stays the same from cycle to cycle. This results in stable behavior. When $\dot{H} > 0$, the mechanical system generates more energy than it dissipates during a single cycle, and the net energy increases from cycle to cycle. This results in increasing instability with time.

A limit cycle is produced when $\dot{H}=0$. In this case, eq. (12) becomes:

$$\oint_\tau [M_\alpha(\alpha) + M_{\dot\alpha}(\dot\alpha, \alpha)]\dot\alpha dt = \oint_\tau [C\dot\alpha]\dot\alpha dt. \qquad (13)$$

where the left hand side represents energy generation terms, and the right hand side represents energy dissipation terms.

Figure 3A:
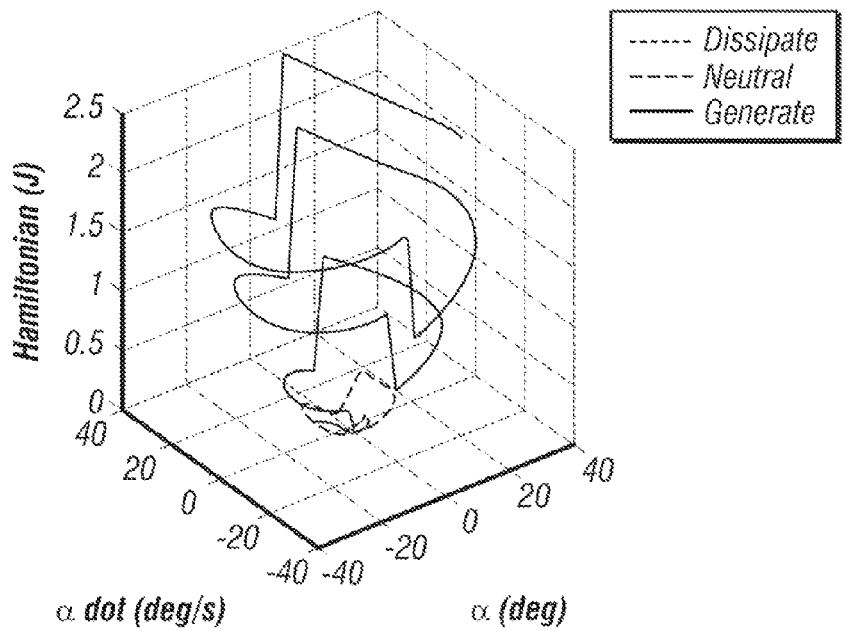
FIG. 3 illustrates Nonlinear Stall Flutter with Linear Dynamic Results: 3D Hamiltonian (a) and Phase Plane Plot (b)
Figure 3B:
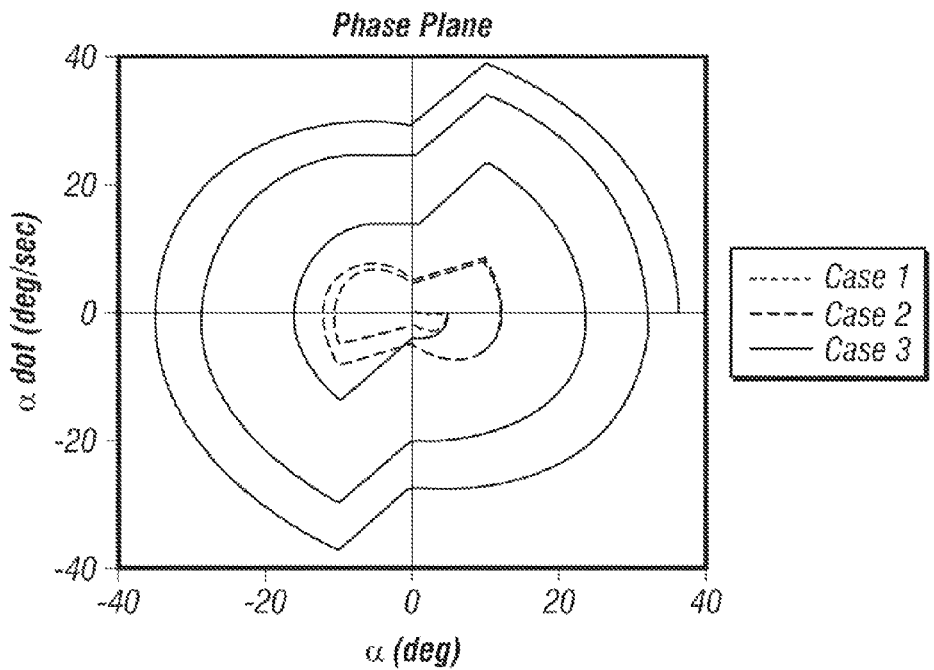
Figure 4A:
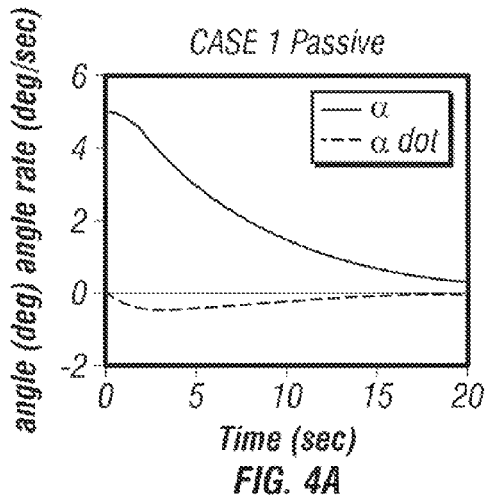
FIG. 4 illustrates Nonlinear Stall Flutter with Linear Dynamic Results: Angular Responses (a,d,g), Power and Energy Flow Responses (b,e,h), and Aero Moment Responses (c,f,i) for each of Case 1 Dissipative (a-c), Case 2 Neutral (d-f), and Case 3 Generative (g-i)
Figure 4D:
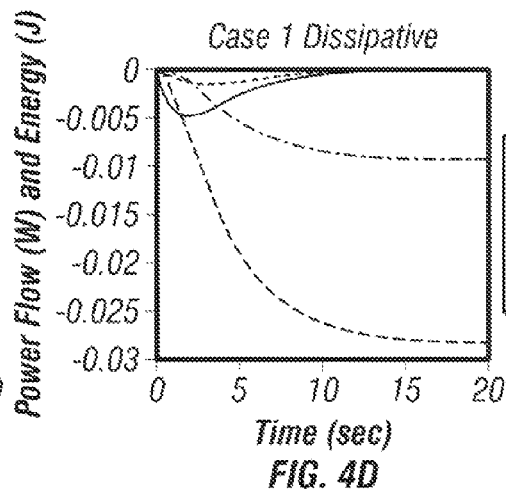
Figure 4B:
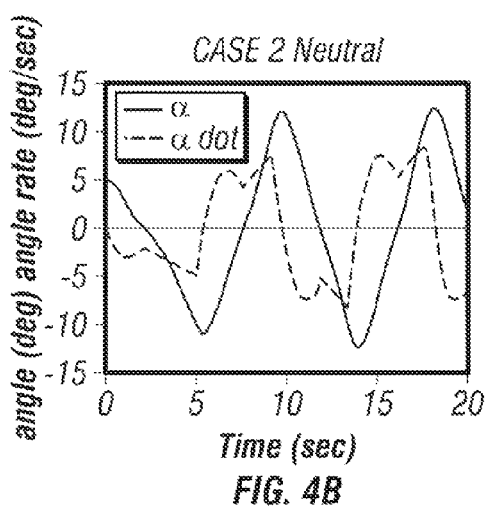
Figure 4E:
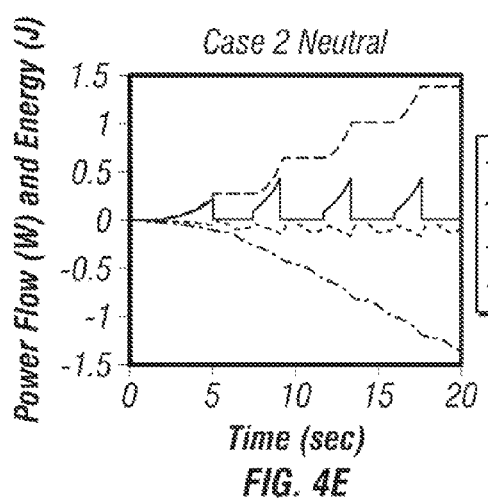
Figure 4C:
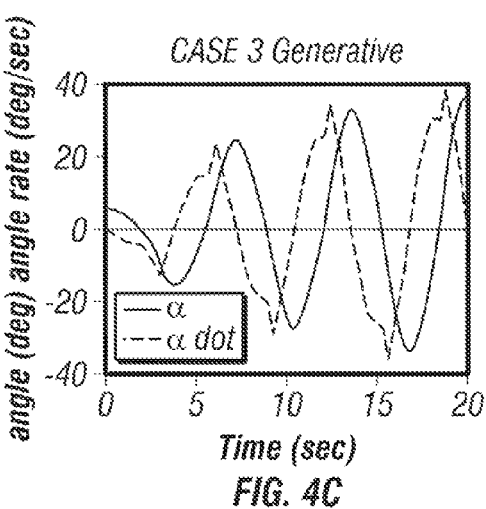
Figure 4F:
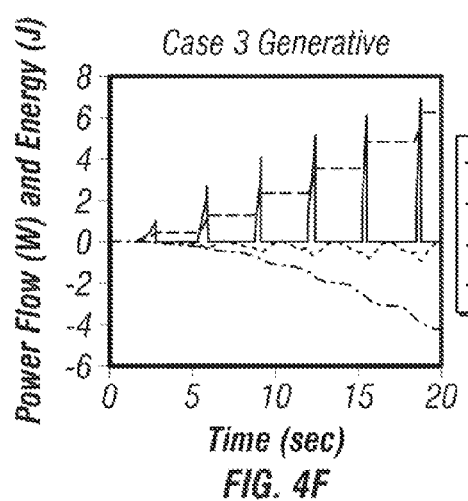
Figure 4G:
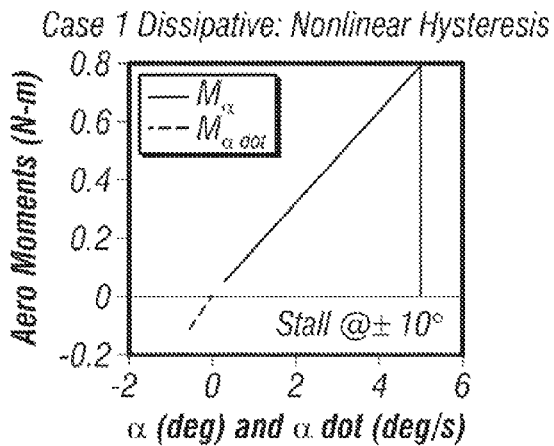
Figure 4H:
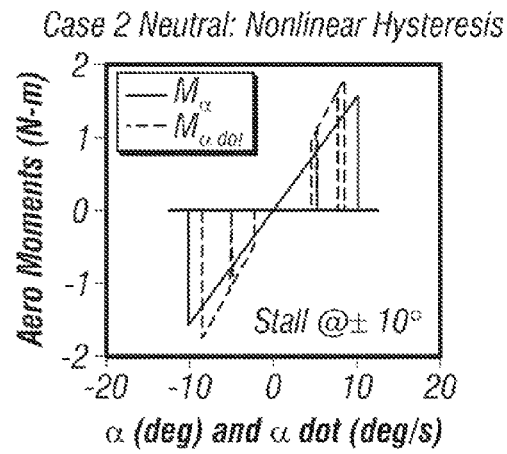
Figure 4I:
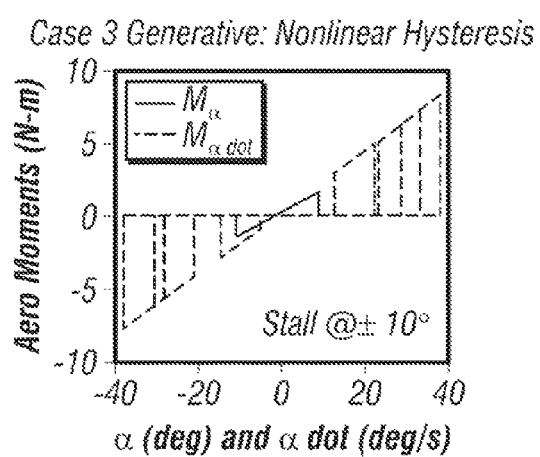

Illustrative examples of numerical results are shown in FIGS. 3 and 4, for three different cases. Case #1 illustrates dissipative (passive) conditions, which produces damped response. Case #2 illustrates a neutral condition, which produces stable, limit-cycle behavior over many cycles. Case #3 illustrates a generative condition, which produces increasing instability. The numerical values of the constants used in these three Cases are shown below. The values were chosen to illustrate the three distinct regions of behavior: Passive (dissipative), Stable Limit-Cycle, and Unstable (generative).

I=10 kg-m²
C=4 kg-m²/s
K=10 N-m
$C_{NL}$=0.01 N-m
$K_{NL}$=50 N-m
$\hat{C}_{M_\alpha}$=0.9 N-m
$\hat{C}_M$=12 N-m-s
$\alpha_{stall}$=±10°

Nonlinear Stall Flutter with Nonlinear Dynamics (No Feedback Control).

The nonlinear stall flutter can be further modified by adding the nonlinear stiffness, $K_{NL}$, and nonlinear damping, $C_{NL}$, terms. In this case, eq. (10) becomes:

$$I\ddot\alpha + C\dot\alpha + C_{NL}\text{sign}(\dot\alpha) + K\alpha + K_{NL}\alpha^3 = M_\alpha(\alpha) + M(\dot\alpha,\alpha) \qquad (14)$$

The Hamiltonians H and $\dot{H}$ are given by:

$$H = \frac{1}{2}I\dot\alpha^2 + \frac{1}{2}K\alpha^2 + \frac{1}{4}K_{NL}\alpha^4 \qquad (15)$$

$$\dot{H} = [I\ddot\alpha + K\alpha + K_{NL}\alpha^3]\dot\alpha = \qquad (16)$$
$$[-C\dot\alpha - C_{NL}\text{sign}(\dot\alpha) + M_\alpha(\alpha) + M_{\dot\alpha}(\dot\alpha, \alpha)]\dot\alpha$$

A limit cycle is produced when:

$$\oint_\tau [M_\alpha(\alpha) + M_{\dot\alpha}(\dot\alpha, \alpha)]\dot\alpha dt = \oint_\tau [C\dot\alpha + C_{NL}\text{sign}(\dot\alpha)]\dot\alpha dt. \qquad (17)$$

$E_{gen}$ and $E_{diss}$ are defined as:

$$E_{gen} = \oint_\tau [M_\alpha(\alpha) + M_{\dot\alpha}(\dot\alpha, \alpha)]\dot\alpha dt \qquad (18)$$

$$E_{diss} = \oint_\tau [C(\dot\alpha) + C_{NL}\text{sign}(\dot\alpha)]\dot\alpha dt \qquad (19)$$

Figure 5A:
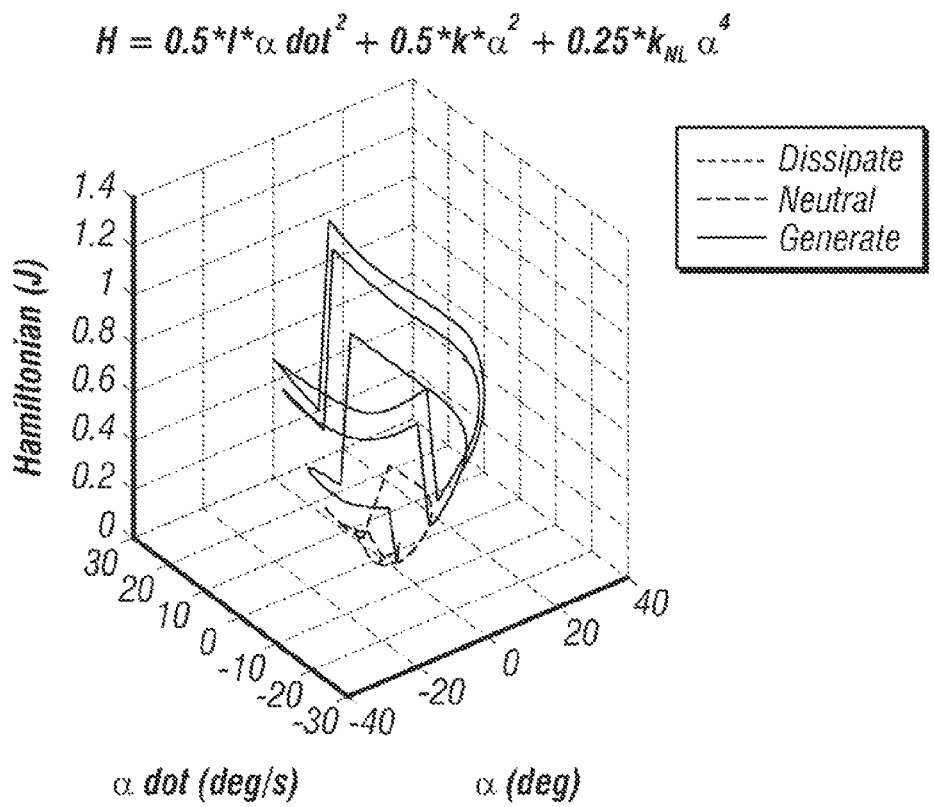
FIG. 5 illustrates Nonlinear Stall Flutter with Nonlinear Dynamic Results: 3D Hamiltonian (a) and Phase Plane Plot (b)
Figure 5B:
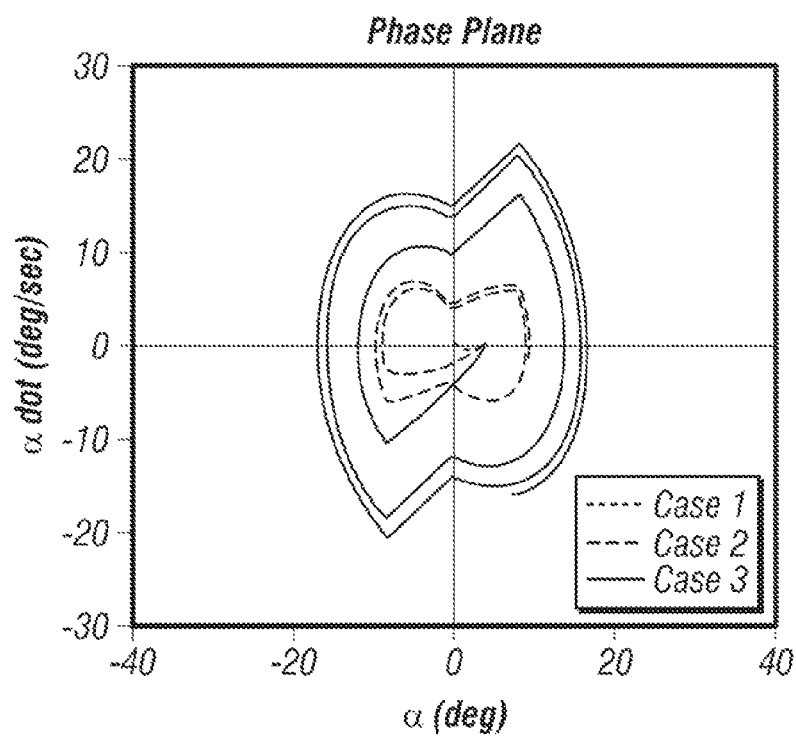
Figure 6A:
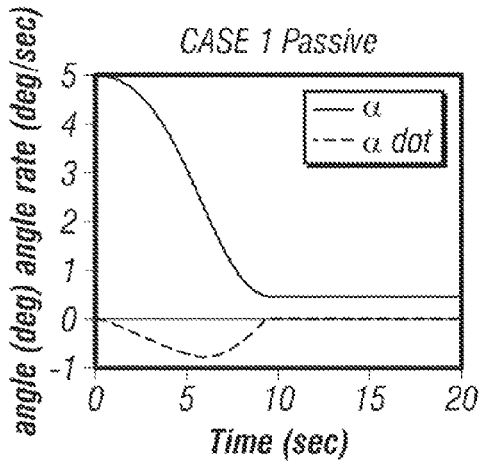
FIG. 6 illustrates Nonlinear Stall Flutter with Nonlinear Dynamic Results: Angular Responses (a,d,g), Power and Energy Flow Responses (b,e,h), and Aero Moment Responses (c,f,i) for each Case 1 Dissipative (a-c), Case 2 Neutral (d-f), and Case 3 Generative (g-i)
Figure 6D:
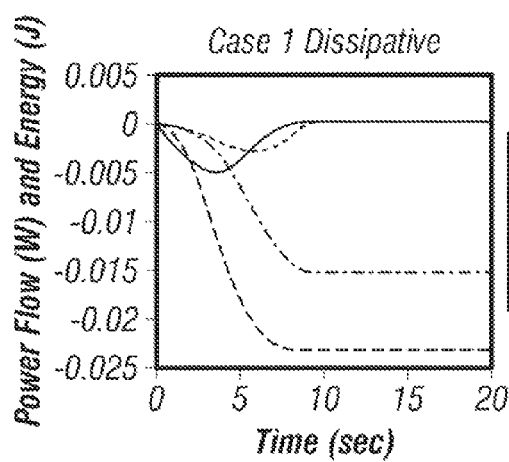
Figure 6B:
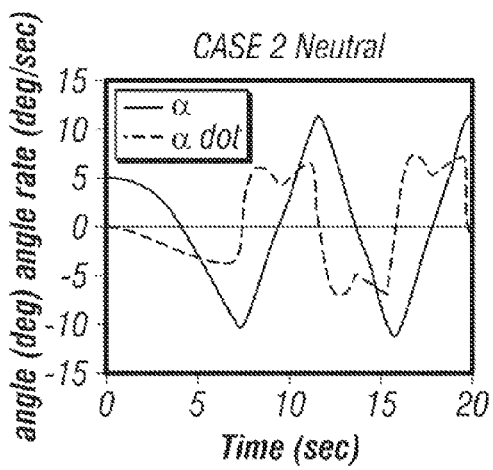
Figure 6E:
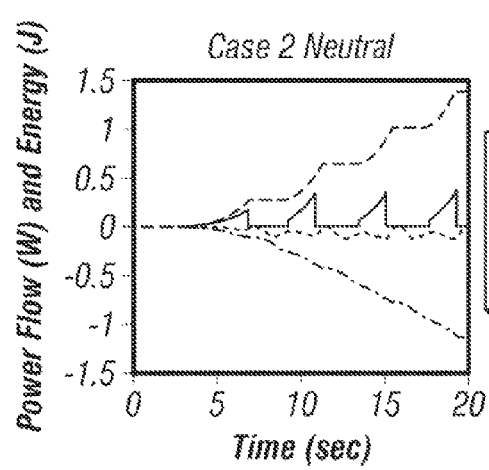
Figure 6C:
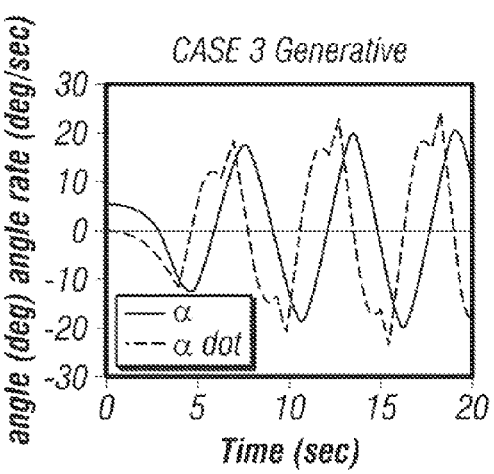
Figure 6F:
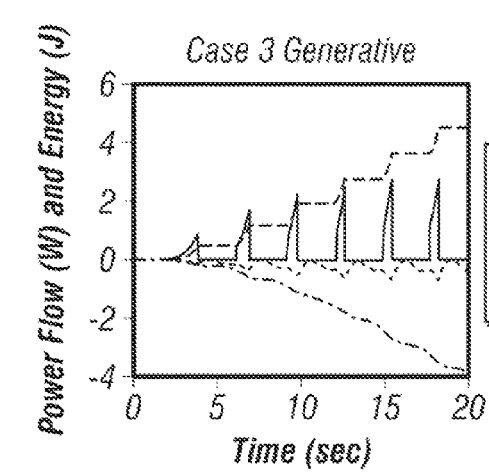
Figure 6G:
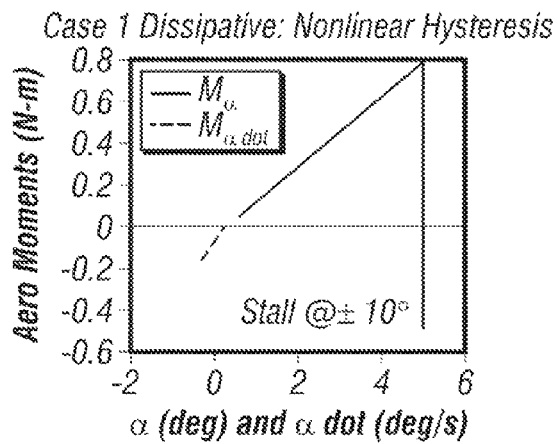
Figure 6H:
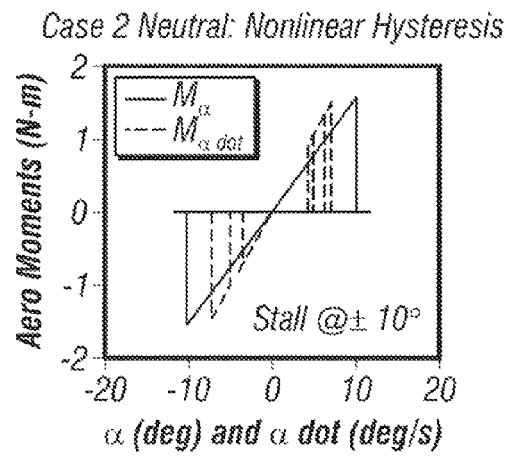
Figure 6I:
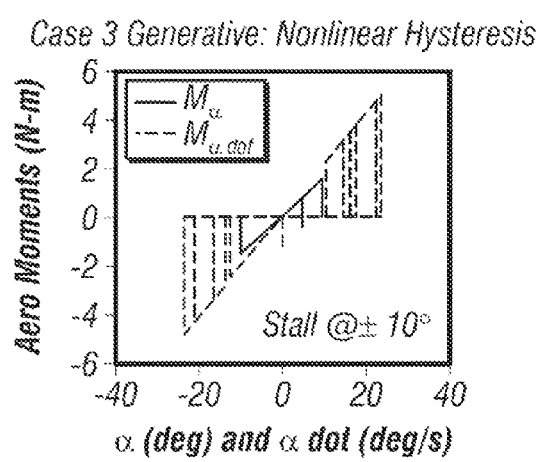

The numerical results are given in FIGS. 5 and 6, for each of the three cases.

Nonlinear Stall with Nonlinear Dynamics and Feedback Control.

The nonlinear system can be further modified by adding feedback control to meet several performance requirements. A PID controller is implemented next, to show the effects of feedback control.

Figure 9:
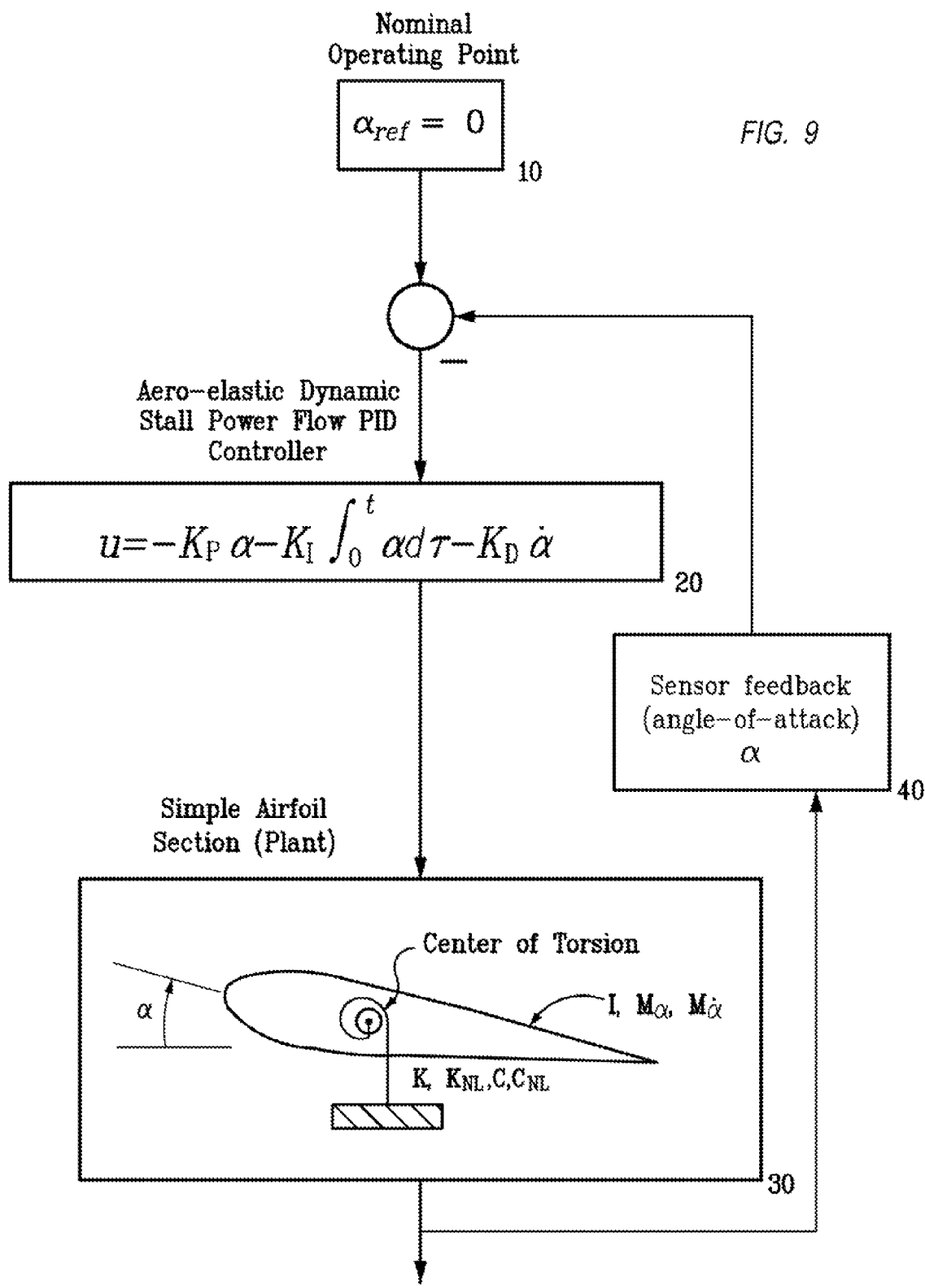
FIG. 9 illustrates a schematic block flow diagram for feedback control of the airfoil pitch angle.

FIG. 9 shows a schematic block diagram for feedback control of the pitch angle, $\alpha$. An initial pitch angle is selected in step 10. During operation, the pitch angle is measured with a sensor in step 40. In step 20, the PID controller compares the instantaneous (actual) pitch angle to the reference/nominal (desired) operating point, and determines if an error correction is needed to bring the measured angle back to the desired angle. The implementation in step 30 of the PID controller input, $\mu$, can be realized in a variety of ways by applying a correction torque. The correction torque could be applied by, for example, using a fast-acting, servo-electro-mechanical actuator system to apply a counter-acting mechanical torque to the long axis of the airfoil segment (e.g., pitch-control via motor-driven worm-gear with clutch or flywheel system; a magneto-rheological fluid system, a direct electromagnetic drive system, etc.). Alternatively, the feedback correction can be implemented by causing rapid changes in the blade shape (morphing wing, microtabs, or conventional flaps) to rapidly increase (or decrease) the aerodynamic drag-induced forces & moments on the blade, or to apply an effective counter-acting mechanical torque to the airfoil section.

With feedback control, $\mu$, added, the 1-DOF equation of motion (eq. 13) then becomes a third-order differential equation:

$$I\ddot\alpha + [K + K_P + K_{NL}\alpha^3] = \qquad (20)$$
$$-[C + K_D]\dot\alpha - C_{NL}\text{sign}(\dot\alpha) + M_\alpha(\alpha) + M_{\dot\alpha}(\dot\alpha, \alpha) - K_I \int_0^t \alpha d\tau$$

The Hamiltonians H and $\dot{H}$ equal:

$$H = \frac{1}{2}I\dot\alpha^2 + \frac{1}{2}[K + K_P]\alpha^2 + \frac{1}{4}\alpha^4 \qquad (21)$$

$$\dot{H} = [I\ddot\alpha + (K + K_P)\alpha + K_{NL}\alpha^3]\dot\alpha \qquad (22)$$

$$= \left[-(C + K_D)\dot\alpha - C_{NL}\text{sign}(\dot\alpha) + M_\alpha(\alpha) + \qquad (23)\right.$$
$$\left. M_{\dot\alpha}(\dot\alpha, \alpha) - K_I \int_0^t \alpha d\tau \right]\dot\alpha$$

A limit cycle is produced when:

$$\oint_\tau \left[M_\alpha(\alpha) + M_{\dot\alpha}(\dot\alpha, \alpha) - K_I \int_0^t \alpha dt_1\right]\dot\alpha dt = \qquad (24)$$
$$\oint_\tau [(C + K_D)\dot\alpha + C_{NL}\text{sign}(\dot\alpha)]\dot\alpha dt.$$

Note that the proportional feedback control gain constant, $K_p$, is not found in eq. (24). This is because the energy stored in the elastic (e.g., spring) elements of the system doesn't change from cycle to cycle.

Other terms were developed that describe energy flows into and out of the system. The terms on the left of eq. (22) are energy generation ($E_{gen}$) and on the right of eq. (22) energy dissipation ($E_{diss}$). The integrands of these terms are power generation ($P_{gen}$) and power dissipation ($P_{diss}$), respectively. $E_{gen}$ and $E_{diss}$ are defined as follows:

$$E_{gen} = \oint_\tau \left[M_\alpha(\alpha) + M_{\dot\alpha}(\dot\alpha, \alpha) - K_I \int_0^t \alpha d\tau\right]\dot\alpha dt \qquad (25)$$

-continued $$E_{diss} = \oint_\tau [(C + K_D)\dot{\alpha} + C_{NL}\text{sign}(\dot{\alpha})]\dot{\alpha} dt \quad (26)$$

Figure 7A:
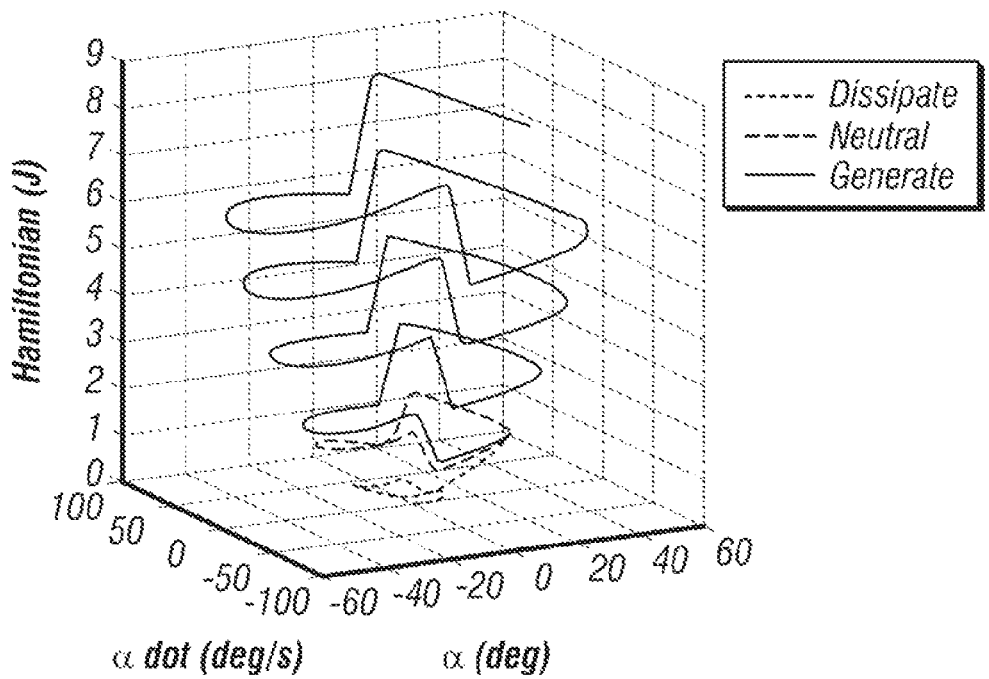
FIG. 7 illustrates Nonlinear Stall Flutter with Nonlinear Dynamics and Control System Results: 3D Hamiltonian (a) and Phase Plane Plot (b)
Figure 7B:
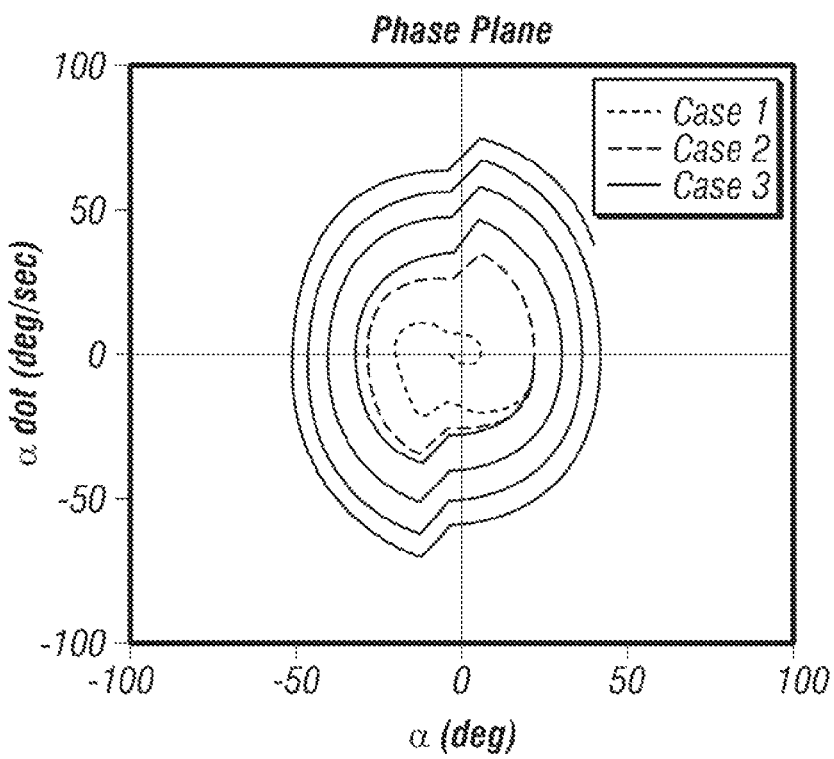
Figure 8A:
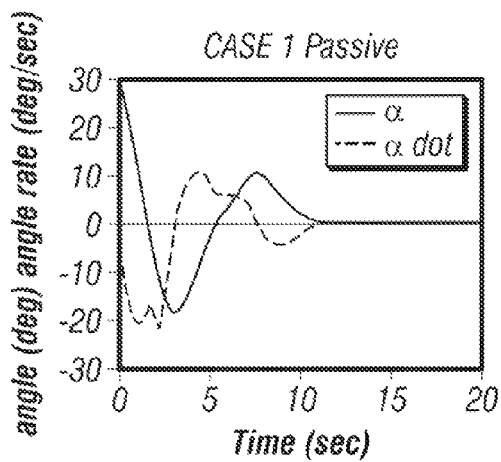
FIG. 8 illustrates Nonlinear Stall Flutter with Nonlinear Dynamics and Control System Results: Angular Responses (a,d,g), Power and Energy Flow Responses (b,e,h), and Aero Moment Responses (c,f,i) for each Case 1 Dissipative (a-c), Case 2 Neutral (d-f), and Case 3 Generative (g-i).
Figure 8D:
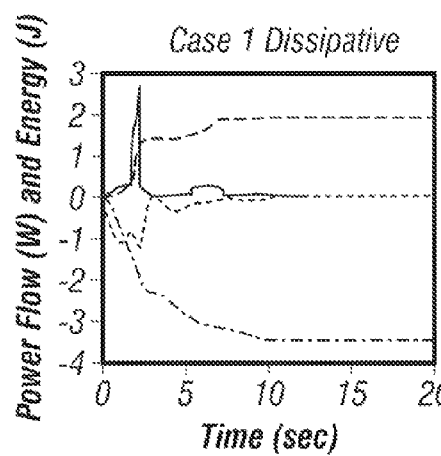
Figure 8B:
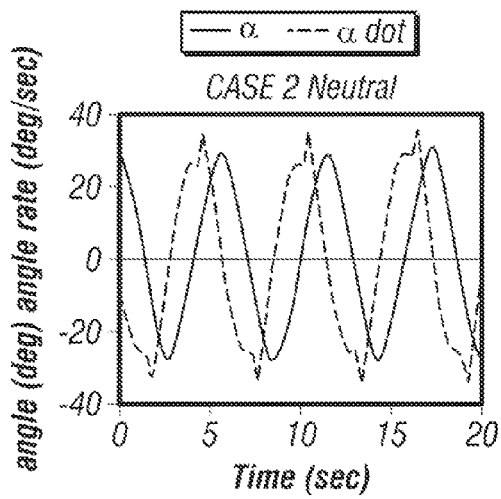
Figure 8E:
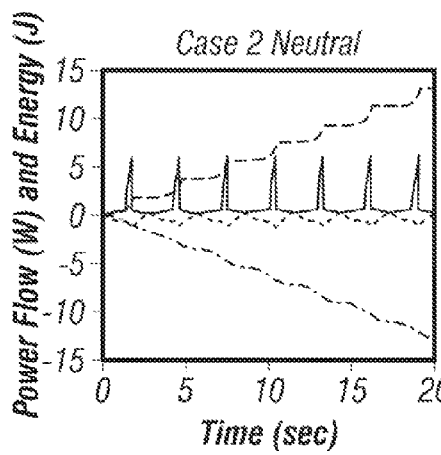
Figure 8C:
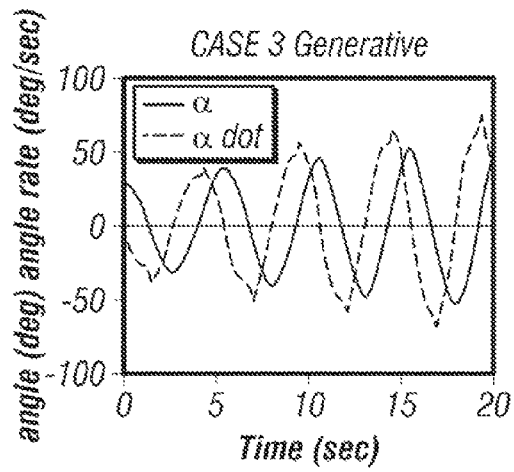
Figure 8F:
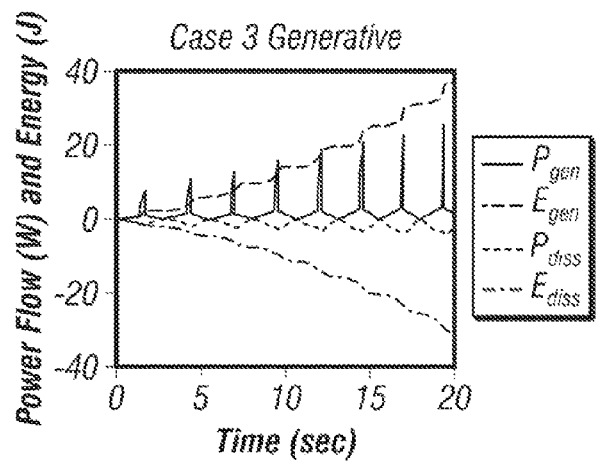
Figure 8G:
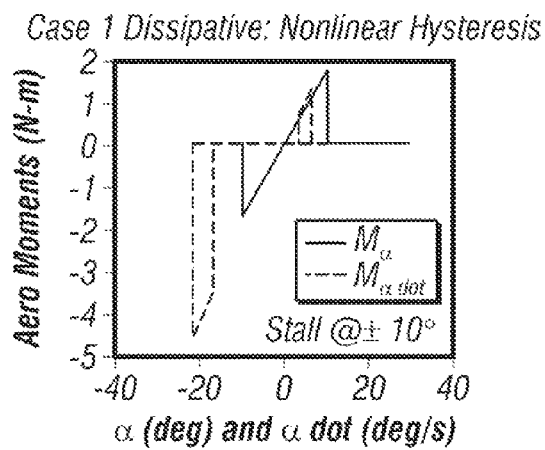
Figure 8H:
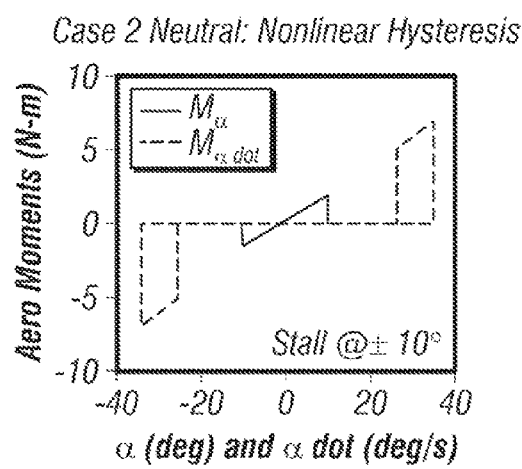
Figure 8I:
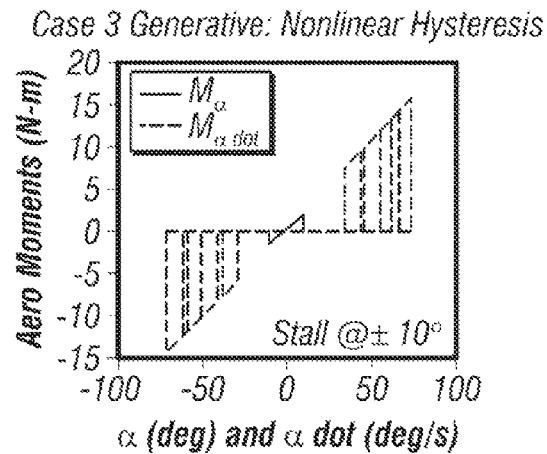

The numerical results are given in FIGS. 7 and 8, for each of the three cases. These results show that a PID feedback controller can be successfully implemented in a 1-DOF nonlinear mechanical system with nonlinear stall flutter and nonlinear dynamics, to produce limit-cycle stable behavior, by using the Non Linear Power Flow Control techniques to balance the energy generating elements with the energy dissipating elements.

In the 1-DOF example studied above, the novel nonlinear power flow control (NLPFC) technique was applied to analyzing a nonlinear stall flutter problem (dynamic stall). The technique directly accommodated nonlinear structural and discontinuous aerodynamic features. The limit cycles were then found by partitioning various terms in the equations that describe the power flows, and identifying when the energy dissipation ($E_{diss}$) and energy generation ($E_{gen}$) terms balanced. The limit cycles were shown to be stability boundaries (this can be clearly seen in FIGS. 5A, 5B, 7A, and 7B). The flutter suppression PID controllers were initially assessed. The closer the wind turbine can safely operate to dynamic stall, the greater the power that can be generated. The NLPFC technique is easily extensible to other systems, including mechanical, non-mechanical, thermal, electrical, chemical, etc. with the same, or greater, degrees-of-freedom, in which limit cycles occur.

Figure 10:
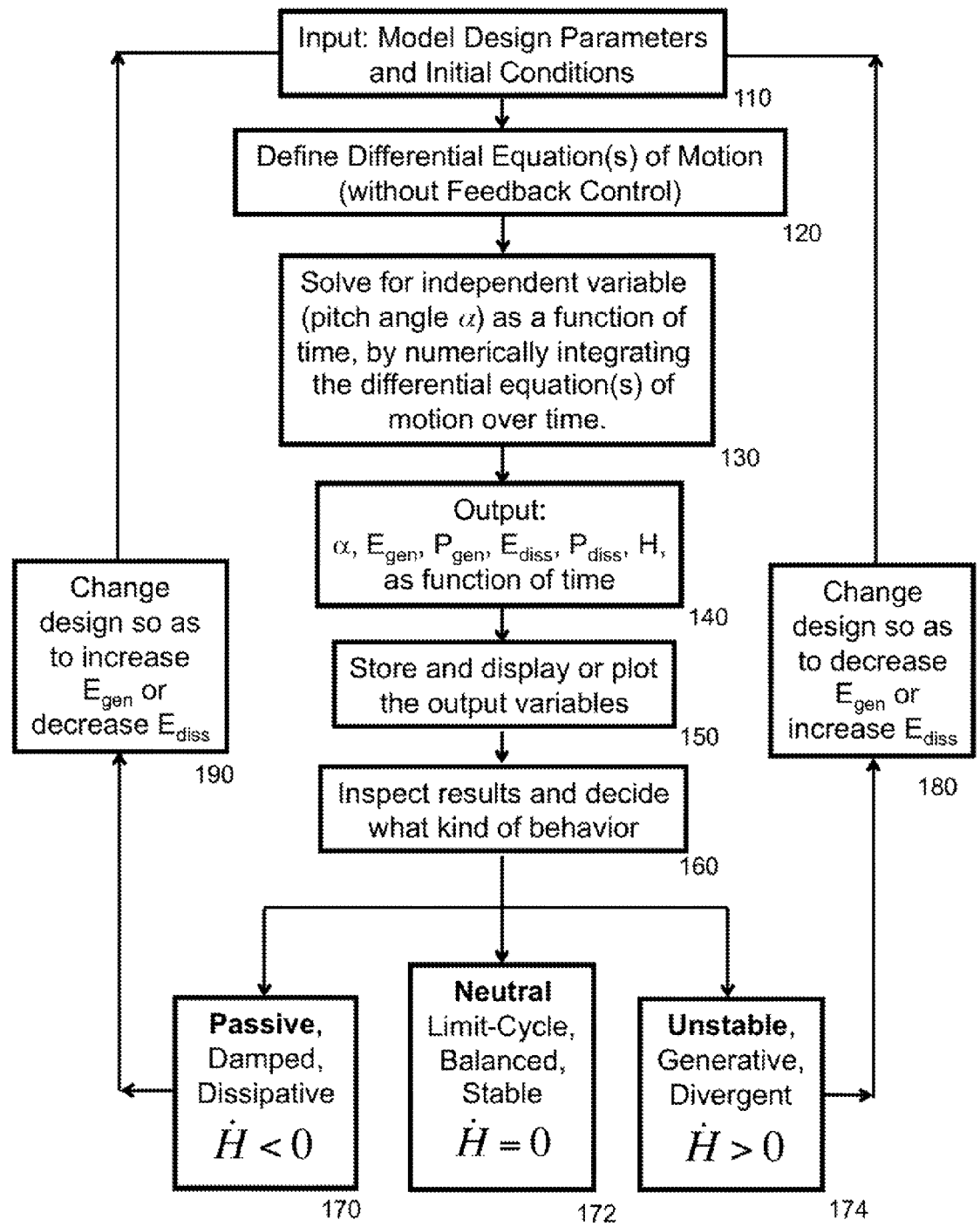
FIG. 10 shows a process flow chart for analyzing the stability of a system.

FIG. 10 shows a schematic flow chart of an example of process steps for using the NLPFC technique, without real-time feedback control, for determining the dynamic pitch stability (i.e., Passive, Neutral, or Unstable) of a particular airfoil design. After determining the design's stability regime, the design parameters (or the initial conditions) can be changed, and the analysis repeated, in an iterative fashion, to reach an acceptable level of stability having a sufficient margin of safety. Note: the steps shown in FIG. 10 are very general, meaning that they can be applied to any set of differential equations describing dynamic (time-dependent) behavior of a system that can be numerically integrated (i.e., not just the 1-DOF example of the rotational stability of an airfoil section).

Referring to FIG. 10, in step 110, a user inputs Model Design Parameters and Initial Conditions to a computer program. In the airfoil section example, the model parameters are: K is the (linear) torsional stiffness, $K_{NL}$ is the nonlinear torsional stiffness, C is the (linear) torsional damping, $C_{NL}$ is the nonlinear torsional damping, I is the wing section torsional moment of inertia, $\alpha_{stall}$ is the stall angle; and $M_\alpha$, M are the aerodynamic twisting moments applied to the blade by the incoming wind (which depend on $\alpha$). The initial conditions are: pitch angle $\alpha$ at time=0; and the wind speed (which is reflected in the magnitude of the aerodynamic moments). The independent (time-dependent) system variable is $\alpha$, the angle of attack of the airfoil section with respect to the incoming wind (or other fluid). Next, in step 120, the user defines the specific equation(s) of motion, and then programs that are put into the computer. In our airfoil example, the user can choose from among any of the four differential equations of motion, Eq. (5), (10), (14), or (18), depending on how robust a simulation the user wants.

Next, in step 130, the user runs the computer program to solve for the independent variable(s), by numerically integrating the different equation (s) of motion from step 120. In the airfoil example, the 1-DOF differential equation for the pitch angle, $\alpha$, is numerically integrated to determine the time-dependent response of $\alpha$. In one embodiment, a $4^{th}$-order Runge-Kutta numerical integration procedure with fixed time stepping can be used. Next, in step 140, the program stores and outputs the results of the numerical integration. The outputs can include: $E_{gen}$, $P_{gen}$, $E_{diss}$, $P_{diss}$, $\alpha$, $\dot{\alpha}$, H, $\dot{H}$, as a function of time. FIGS. 2-8 show examples of these outputs.

Next, in step 150, the user (or computer) displays/graphs/plots the results of the output variables. Then, in step 160, the user inspects the plots and decides what kind of behavior is being displayed by the system. Alternatively, step 160 could be automated as part of the computer program. During the inspection/decision step 160, the user looks to see if the system is behaving in a passive/damped manner (step 170); or in a neutral, balanced, stable manner with a defined limit-cycle (step 172); or in an unstable, generative, divergent manner (step 174). If the system is Passive (step 170), then $\dot{H}<0$ and the independent variable, $\alpha$, decays to a fixed value; and some energy measures (H and $P_{gen}$) decay to zero over time. If the system is Neutral (step 172), then $\dot{H}=0$ and both the independent variable, $\alpha$, and the Hamiltonian, H, follow a stable (neutral) limit-cycle path. Also, the plot of $E_{gen}$ versus time closely matches the plot of $-E_{diss}$ versus time; indicating that the energy generating terms closely balance the energy dissipation terms. If the system is Unstable (step 174), then $\dot{H}>0$, and both the independent variable, $\alpha$, and some energy measures (H and $P_{gen}$) increase in a divergent manner with each cycle.

After determining the type of system behavior, the user can choose to modify the design (or change the initial conditions) to shift the response from one type to another (e.g., from Unstable to Neutral or Passive). If the system is too Passive, the user in step 190 can change the design, e.g., by increasing energy generation ($E_{gen}$), or decreasing energy dissipation ($E_{diss}$), or doing both. Then, steps 110-160 are repeated, and iterated with step 180, until the behavior shifts to Neutral. When the system is Neutral, then no further design changes are needed. Alternatively, if the system is too Unstable, the user in step 180 can change the design decreasing energy generation ($E_{gen}$), or increasing energy dissipation ($E_{diss}$), or doing both. Then, steps 110-160 are repeated, and iterated with step 180, until the response shifts to Neutral or Passive.

Figure 11:
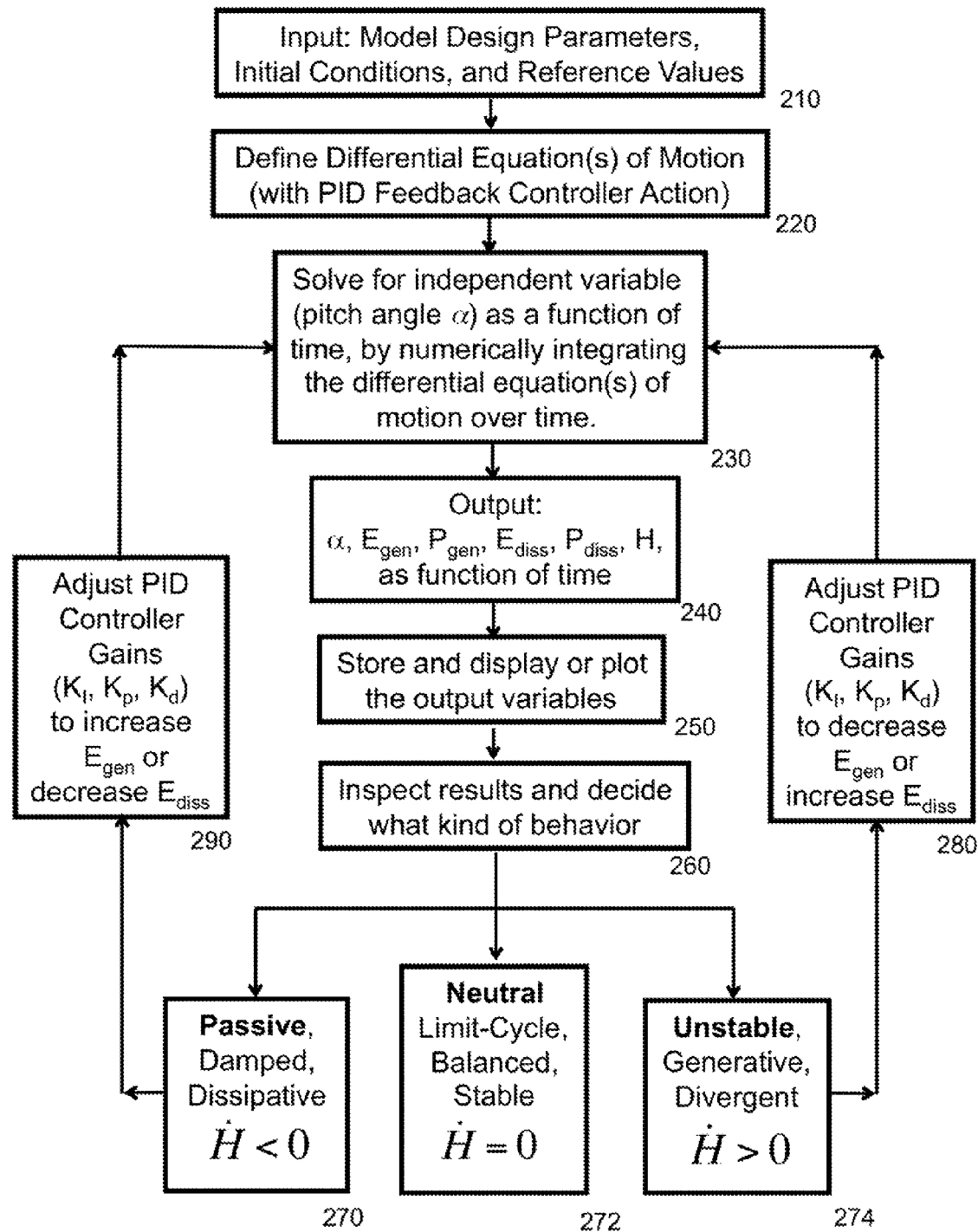
FIG. 11 shows a process flow chart for determining PID controller gains, $K_I$, $K_p$, $K_d$, which are used for controlling the stability of a system.

FIG. 11 shows a schematic flow chart of an example of process steps for using the NLPFC technique, with real-time PID feedback controller action, to analyze the system response, then iteratively select the best PID controller gain values ($K_I$, $K_d$, $K_p$) for controlling (and, ideally, preventing) unstable system behavior during operation. FIG. 11 is basically identical to FIG. 10, with the exception of steps 210, 280 and 290, which are different. In step 210, the user also inputs any reference/setpoint values (e.g., the desired value for pitch angle, $\alpha_{ref}$). Steps 210 to 260 are the same as described above for FIG. 10. Then, after completing step 260, the user decides if the system behavior is Passive (270), Neutral (272), or Unstable (274).

Continuing with FIG. 11, if the system response is too Passive, the user in step 290 can adjust the PID gains ($K_I$, $K_d$, $K_p$) to increase energy generation ($E_{gen}$), or decrease energy dissipation ($E_{diss}$), or do both. Then, steps 230-260 are repeated, and iterated with step 290, until the response shifts to Neutral (272). Alternatively, if the system is too Unstable, the user in step 280 can adjust the PID gains ($K_I$, $K_d$, $K_p$) to decrease energy generation. ($E_{gen}$), or increase energy dissipation ($E_{diss}$), or do both. Then, steps 110-160 are repeated, and iterated with step 180, until the response shifts to Neutral (or Passive).

It is difficult and extremely time-consuming to numerically integrate the $2^{nd}$ order and $3^{rd}$ order differential equation (or equations) of motion used in the NLPFC technique by hand. Hence, in a preferred embodiment, and as readily understood by one of ordinary skill in the art, the method steps are performed in an automated manner by a general or specific purpose computer programmed with executable computer program software implementing the mathematical algorithms and steps described above. Such a computer comprises well-known components, i.e., computer microprocessor/CPU, memory unit, storage device, computer software, input/output components, network interface, power supply, etc. Such computer software may be in any appropriate computer language, including C++, FORTRAN, Java, assembly language, microcode, MATLAB, MathWorks, etc. Such executable computer program software may be embodied on any type of non-transitory computer-readable storage medium, including without limitation: CD-ROMs, DVD-ROMs, hard drives (local or network storage device), USB keys, other removable drives, ROM, and firmware.

Figure 12:
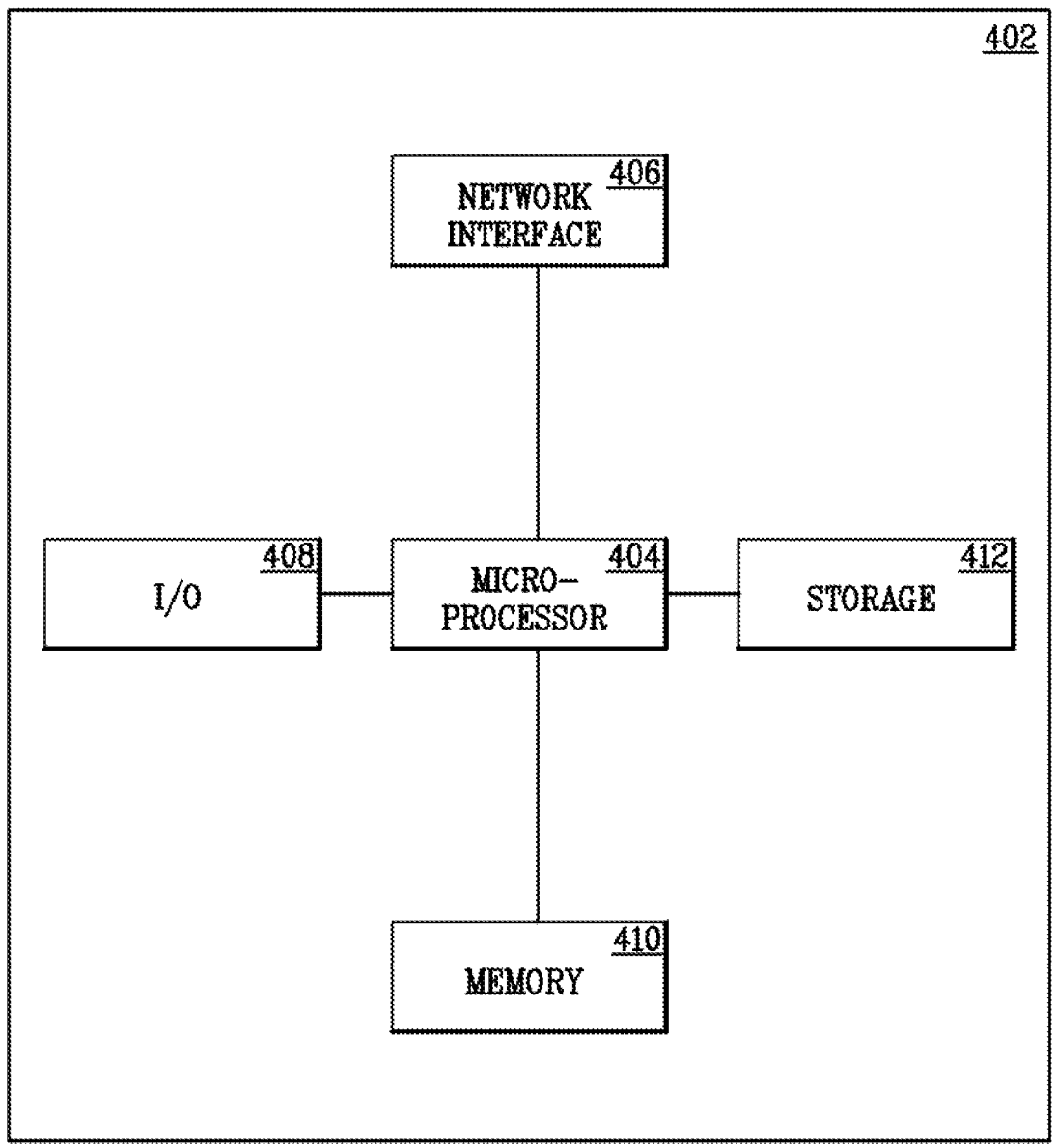
FIG. 12 shows a high-level block diagram illustrating the components of a general purpose computer, when, when programmed with executable software for carrying out the method steps of the present invention, becomes a special purpose computer.

FIG. 12 shows a high-level block diagram illustrating the components of a general-purpose computer that, when programmed with executable software for carrying out the method steps of the present invention, becomes a dedicated, special purpose computer. Computer 402 contains a processor 404, which controls the overall operation of computer 402 by executing computer program instructions that define such operation. The computer program instructions may be stored in a storage device 412 (e.g., magnetic disk) and loaded into memory 410 when execution of the computer program instructions is desired. Thus, the operation of the computer will be defined by computer program instructions stored in memory 410 and/or storage 412 and the operation of the computer will be controlled by processor 404 executing the computer program instructions. Computer 402 can also includes one or more network interfaces 406 for communicating with other devices via a network. Computer 402 also includes input/output means 408 that represents devices that allow for user interaction with the computer 402 (e.g., display, keyboard, mouse, speakers, buttons, etc.). One skilled in the art will recognize that an implementation of an actual computer will contain other components as well, and that FIG. 12 is a high-level representation of some of the components of such a computer for illustrative purposes.

In a first embodiment, the present invention can comprise:

A method of determining the pitch stability characteristics of an airfoil, comprising using a computer to numerically integrate a differential equation of motion characterizing the time-dependent response of the airfoil's pitch angle, $\alpha$, measured relative to the direction of an incoming fluid flowing towards the airfoil; wherein the method comprises the steps of:
a) inputting airfoil design parameters and system initial conditions to a memory unit of a computer;
b) programming into the memory unit a differential equation of motion that models the response of the airfoil's pitch angle as a function of time;
c) the computer calculating the time-dependent response of the pitch angle, $E_{gen}$, and $E_{diss}$, by using a microprocessor in the computer to numerically integrate the differential equation of motion over a specified period of time;
d) storing results of the numerical integration step in the computer's memory, wherein the results comprise: $\alpha$, $E_{gen}$, and $E_{diss}$ as a function of time;
e) inspecting the results, and then categorizing the airfoil's transient response as being: (1) Passive if the response is damped and dissipative, (2) Neutral Limit-Cycle if the response is balanced and stable, or (3) Unstable if the response is generative and divergent.

The first method can further comprise:
f) after step e), changing one or more airfoil design parameters, or initial conditions, or both;
g) then repeating another analysis run comprising steps a) through e); and
h) iterating steps a) through g) until a Neutral Limit-Cycle response has been achieved.

The first method can further comprise: wherein if the airfoil's transient response in step e) is Passive; then step f) comprises changing the airfoil design in such a way that increases $E_{gen}$, or decreases $E_{diss}$, or that does both, in the next analysis run, when compared to a previous analysis run.

The first method can further comprise: wherein if the airfoil's transient response in step e) is Unstable; then step f) comprises changing the airfoil design in a way that decreases $E_{gen}$, or increases $E_{diss}$, or that does both, in the next analysis run, when compared to a previous analysis run.

The first method can further comprise: wherein the differential equation of motion comprises a single independent variable, $\alpha$; and the equation comprises:

$$I\ddot{\alpha}+C\dot{\alpha}+C_{NL}\,\text{sign}\,(\dot{\alpha})+K\alpha+K_{NL}\alpha^3=M_\alpha(\alpha)+M(\dot{\alpha},\alpha)$$

wherein $\alpha$ is the pitch angle, K is the torsional stiffness, $K_{NL}$ is the nonlinear torsional stiffness, C is the torsional damping, $C_{NL}$ is the nonlinear torsional damping, I is the airfoil's rotational moment of inertia, and $M_\alpha$, M are the applied aerodynamic moments The first method can further comprise: wherein the aerodynamic moments $M_\alpha$, M are based on the following nonlinear hysteresis logic, having two discontinuities in $M_\alpha$, and one discontinuity in M:

$$M_\alpha(\alpha) = \begin{cases} \hat{C}_{M_\alpha}\alpha & \text{for} & |\alpha| < \alpha_{stall} \\ 0 & \text{for} & |\alpha| > \alpha_{stall} \\ 0 & \text{for} & the\,return\,hysteresis\,cycle \end{cases}$$

and $$M_{\dot{\alpha}}(\dot{\alpha},\alpha) = \begin{cases} \hat{C}_{M_{\dot{\alpha}}}\dot{\alpha} & \text{for} & |\alpha| < \alpha_{stall} \\ 0 & \text{for} & |\alpha| > \alpha_{stall}. \end{cases}$$

The first method can further comprise:
using the computer to calculate the energy terms $E_{gen}$ and $E_{diss}$, where:

$$E_{gen} = \oint_\tau [M_\alpha(\alpha) + M_{\dot{\alpha}}(\dot{\alpha},\alpha)]\dot{\alpha}\,dt$$

$$E_{diss} = \oint_\tau [C(\dot{\alpha}) + C_{NL}\text{sign}(\dot{\alpha})]\dot{\alpha}\,dt$$

comparing $E_{gen}$ to $E_{diss}$; and
then deciding, if $E_{gen}$ is equal to $E_{diss}$, that a Neutral Limit-Cycle response has been produced.

The first method can further comprise: wherein the numerical integration step uses a fixed time-step, $4^{th}$ order Runge-Kutta solution technique.

The first method can further comprise: wherein the torsional stiffness, K, is selected to represent the torsional modulus of elasticity of a long blade or wing having said airfoil shape.

In a second embodiment, the present invention can comprise:

A method of determining the pitch stability of an airfoil, comprising using a computer to numerically integrate a differential equation of motion that includes terms describing PID controller action; wherein the differential equation characterizes the time-dependent response of the airfoil's pitch angle, $\alpha$, measured relative to the direction of an incoming fluid flowing towards the airfoil; wherein the method comprises the steps of:

a) inputting airfoil design parameters, system initial conditions, and feedback control reference values to a memory unit of a computer;

b) programming into the memory unit a differential equation of motion that has terms describing PID controller action, which models the response of the airfoil's pitch angle as a function of time;

c) the computer calculating the time-dependent response of the pitch angle, $E_{gen}$, and $E_{diss}$, by using a microprocessor in the computer to numerically integrate the differential equation of motion over a specified period of time;

d) storing results of the numerical integration step in the computer's memory, wherein the results comprise: $\alpha$, $E_{gen}$, and $E_{diss}$ as a function of time;

e) inspecting the results, and then categorizing the airfoil's transient response as being: (1) Passive if the response is damped and dissipative, (2) Neutral Limit-Cycle if the response is balanced and stable, or (3) Unstable if the response is generative and divergent.

The second method can further comprise:

f) after step e), adjusting one or more PID controller gain values, $K_I$, $K_P$, or $K_D$;

g) then repeating another analysis run comprising steps a) through e), and then:

h) iterating steps a) through g) until a Neutral Limit-Cycle response has been achieved.

The second method can further comprise: wherein if the airfoil's transient response in step e) is Passive; then step f) comprises changing $K_I$ or $K_D$ in such a way that increases $E_{gen}$, or decreases $E_{diss}$, or that does both, in the next analysis run, when compared to a previous analysis run.

The second method can further comprise: wherein if the airfoil's transient response in step e) is Unstable; then step f) comprises changing $K_I$ or $K_D$ in such a way that decreases $E_{gen}$, or increases $E_{diss}$, or that does both, in the next analysis run, when compared to a previous analysis run.

The second method can further comprise: wherein the differential equation of motion comprises a single independent variable, $a$; and the equation comprises:

$$I\ddot{\alpha} + [K + K_P]\alpha + K_{NL}\alpha^3 =$$
$$-[C + K_D]\dot{\alpha} - C_{NL}\text{sign}(\dot{\alpha}) + M_\alpha(\alpha) + M_{\dot{\alpha}}(\dot{\alpha}, \alpha) - K_I \int_0^t \alpha d\tau$$

wherein $\alpha$ is the pitch angle, K is the torsional stiffness, $K_{NL}$ is the nonlinear torsional stiffness, C is the torsional damping, $C_{NL}$ is the nonlinear torsional damping, I is the airfoil's rotational moment of inertia, and $M_\alpha$, M are the applied aerodynamic moments The second method can further comprise: wherein the aerodynamic moments $M_\alpha$, M are based on the following nonlinear hysteresis logic, having two discontinuities in $M_\alpha$, and one discontinuity in M:

$$M_\alpha(\alpha) = \begin{cases} \hat{C}_{M_\alpha}\alpha & \text{for} & |\alpha| < \alpha_{stall} \\ 0 & \text{for} & |\alpha| > \alpha_{stall} \\ 0 & \text{for} & thereturnhysteresiscycle \end{cases}$$

and $$M_{\dot{\alpha}}(\dot{\alpha}, \alpha) = \begin{cases} \hat{C}_{M_{\dot{\alpha}}}\dot{\alpha} & \text{for} & |\alpha| < \alpha_{stall} \\ 0 & \text{for} & |\alpha| > \alpha_{stall} \end{cases}$$

The second method can further comprise:

using the computer to calculate the energy terms $E_{gen}$ and $E_{diss}$, where:

$$E_{gen} = \oint_T \left[M_\alpha(\alpha) + M_{\dot{\alpha}}(\dot{\alpha}, \alpha) - K_I \int_0^t \alpha d\tau\right]\dot{\alpha} dt$$

$$E_{diss} = \oint_T [(C + K_D)\dot{\alpha} + C_{NL}\text{sign}(\dot{\alpha})]\dot{\alpha} dt$$

comparing $E_{gen}$ to $E_{diss}$, and then deciding, if $E_{gen}$ is equal to $E_{diss}$, that a Neutral Limit-Cycle response has been produced.

The second method can further comprise: wherein the numerical integration step uses a fixed time-step, $4^{th}$ order Runge-Kutta solution technique.

The second method can further comprise: further comprising performing steps a) through k) in real-time during operation of a system comprising said airfoil; and then providing updated values of the PID controller gain constants, $K_I$, $K_P$, and $K_D$ to a PID controller unit that supplies signals in real-time to an actuator coupled to the airfoil, that generates opposing feedback control forces, $\mu$, on the airfoil according to the following equation:

$$I\ddot{\alpha} + K\alpha + K_{NL}\alpha^3 = -C\dot{\alpha} - C_{NL} \quad \text{sign} \quad (\dot{\alpha}) + \mu + M_\alpha(\alpha) + M(\dot{\alpha}, \alpha)$$

where $$u = -K_P\alpha - K_I \int_0^t \alpha d\tau - K_D\dot{\alpha}.$$

The second method can further comprise: wherein the torsional stiffness, K, is selected to represent the torsional modulus of elasticity of a long blade or wing having said airfoil shape.

In a third embodiment, the present invention can comprise:

A method for controlling a physical apparatus comprising an airfoil, the method comprising the steps of:

a) implementing on a computer a model of the physical apparatus, said model comprising a nonlinear system of equations;

b) determining automatically via said computer model limit cycles of said model;

c) automatically using said limit cycles to determine stability boundaries of the physical apparatus; and d) controlling the physical apparatus so as to permit operation close to said stability boundaries and preventing the physical apparatus from unintentionally crossing said stability boundaries.

The third method can further comprise: wherein said computer model comprises a nonlinear dynamic stall flutter model of the airfoil.

The third method can further comprise: wherein a Hamiltonian equation is employed by said computer model.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

The invention claimed is:

1. A method of determining pitch stability characteristics of an airfoil, comprising using a computer to numerically integrate a differential equation of motion characterizing a time-dependent response of an airfoil's pitch angle, $\alpha$, measured relative to direction of an incoming fluid flowing towards the airfoil; wherein the method comprises steps of:
   a) inputting airfoil design parameters and system initial conditions to a memory unit of a computer;
   b) programming into the memory unit a differential equation of motion that models a response of the airfoil's pitch angle as a function of time;
   c) the computer calculating the time-dependent response of the airfoil's pitch angle, energy generation ($E_{gen}$), and energy dissipation ($E_{diss}$), by using a microprocessor in the computer to numerically integrate the differential equation of motion over a specified period of time;
   d) storing results of the numerical integration step in the computer's memory, wherein the results comprise: $\alpha$, $E_{gen}$, and $E_{diss}$ as a function of time;
   e) inspecting the results, and then categorizing an airfoil's transient response as being: (1) Passive if the response is damped and dissipative, (2) Neutral Limit-Cycle if the response is balanced and stable, or (3) Unstable if the response is generative and divergent.

2. The method of claim 1, further comprising:
   f) after step e), changing one or more airfoil design parameters, or initial conditions, or both;
   g) then repeating another analysis run comprising steps a) through e); and
   h) iterating steps a) through g) until a Neutral Limit-Cycle response has been achieved.

3. The method of claim 2, wherein if the airfoil's transient response in step e) is Passive; then step f) comprises changing a design of the airfoil in such a way that increases $E_{gen}$, or decreases $E_{diss}$, or that does both, in the next analysis run, when compared to a previous analysis run.

4. The method of claim 2, wherein if the airfoil's transient response in step e) is Unstable; then step f) comprises changing a design of the airfoil in a way that decreases $E_{gen}$, or increases $E_{diss}$, or that does both, in the next analysis run, when compared to a previous analysis run.

5. The method of claim 1, wherein the differential equation of motion comprises a single independent variable, $\alpha$; and the equation comprises:

$$I\ddot{\alpha} + C\dot{\alpha} + C_{NL}\sin(\dot{\alpha}) + K\alpha + K_{NL}\alpha^3 = -M_\alpha(\alpha) + M(\dot{\alpha},\alpha)$$

wherein $\alpha$ is the pitch angle, $K$ is torsional stiffness, $K_{NL}$ is nonlinear torsional stiffness, $C$ is torsional damping, $C_{NL}$ is nonlinear torsional damping, $I$ is an airfoil's rotational moment of inertia, and $M_\alpha$, $M$ are applied aerodynamic moments.

6. The method of claim 1, further comprising:
using the computer to calculate the energy terms $E_{gen}$ and $E_{diss}$, where:

$$E_{gen} = \oint_\tau [M_\alpha(\alpha) + M_{\dot{\alpha}}(\dot{\alpha},\alpha)]\dot{\alpha}\,dt$$

$$E_{diss} = \oint_\tau [C(\dot{\alpha}) + C_{NL}\sin(\dot{\alpha})]\dot{\alpha}\,dt$$

wherein $C$ is torsional damping, $C_{NL}$ is nonlinear torsional damping, and $M_\alpha$, $M$ are applied aerodynamic moments; comparing $E_{gen}$ to $E_{diss}$; and
then deciding, if $E_{gen}$ is equal to $E_{diss}$, that a Neutral Limit-Cycle response has been produced.

7. The method of claim 1, wherein the numerical integration step uses a fixed time-step, $4^{th}$ order Runge-Kutta solution technique.

8. The method of claim 1, wherein the torsional stiffness, $K$, is selected to represent a torsional modulus of elasticity of a long blade or wing having said airfoil shape.

9. A method of determining pitch stability of an airfoil, comprising using a computer to numerically integrate a differential equation of motion that includes terms describing PID controller action; wherein the differential equation characterizes a time-dependent response of an airfoil's pitch angle, $\alpha$, measured relative to direction of an incoming fluid flowing towards the airfoil; wherein the method comprises steps of
   a) inputting airfoil design parameters, system initial conditions, and feedback control reference values to a memory unit of a computer;
   b) programming into the memory unit a differential equation of motion that has terms describing PID controller action, which models a response of the airfoil's pitch angle as a function of time;
   c) the computer calculating the time-dependent response of the airfoil's pitch angle, energy generation ($E_{gen}$), and energy dissipation ($E_{diss}$), by using a microprocessor in the computer to numerically integrate the differential equation of motion over a specified period of time;
   d) storing results of the numerical integration step in the computer's memory, wherein the results comprise: $\alpha$, $E_{gen}$, and $E_{diss}$ as a function of time;
   e) inspecting the results, and then categorizing an airfoil's transient response as being: (1) Passive if the response is damped and dissipative, (2) Neutral Limit-Cycle if the response is balanced and stable, or (3) Unstable if the response is generative and divergent.

10. The method of claim 9, further comprising:
   f) after step e), adjusting one or more PID controller gain values, integral gain ($K_I$), proportional gain ($K_P$), or derivative gain ($K_D$);
   g) then repeating another analysis run comprising steps a) through e), and then:
   h) iterating steps a) through g) until a Neutral Limit-Cycle response has been achieved.

11. The method of claim 10, wherein if the airfoil's transient response in step e) is Passive; then step f) comprises changing $K_I$ or $K_D$ in such a way that increases $E_{gen}$, or decreases $E_{diss}$, or that does both, in the next analysis run, when compared to a previous analysis run.

12. The method of claim 10, wherein if the airfoil's transient response in step e) is Unstable; then step f) comprises changing $K_I$ or $K_D$ in such a way that decreases $E_{gen}$, or increases $E_{diss}$, or that does both, in the next analysis run, when compared to a previous analysis run.

13. The method of claim 9, wherein the differential equation of motion comprises a single independent variable, $\alpha$; and the equation comprises:

$$I\ddot{\alpha}+[K+K_P]\alpha+K_{NL}\alpha^3=-[C+K_D]\dot{\alpha}-C_{NL}\sin(\dot{\alpha})+M_\alpha(\alpha)+M(\dot{\alpha},\alpha)-K_I\int_0^t\alpha d\tau$$

wherein $\alpha$ is the pitch angle, K is torsional stiffness, $K_{NL}$ is nonlinear torsional stiffness, C is torsional damping, $C_{NL}$ is nonlinear torsional damping, I is airfoil's rotational moment of inertia, and $M_\alpha$, M are applied aerodynamic moments.

14. The method of claim 9, further comprising:
using the computer to calculate the energy terms $E_{gen}$ and $E_{diss}$, where:

$$E_{gen} = \oint_\tau \left[M_\alpha(\alpha) + M_{\dot{\alpha}}(\dot{\alpha},\alpha) - K_I\int_0^t \alpha d\tau\right]\dot{\alpha}dt$$

$$E_{diss} = \oint_\tau [(C+K_D)\dot{\alpha} + C_{NL}\sin(\dot{\alpha})]\dot{\alpha}dt$$

wherein $K_I$ is integral gain, $K_D$ is derivative gain, C is torsional damping, $C_{NL}$ is nonlinear torsional damping, and $M_\alpha$, M are applied aerodynamic moments;
comparing $E_{gen}$ to $E_{diss}$; and
then deciding, if $E_{gen}$ is equal to $E_{diss}$, that a Neutral Limit-Cycle response has been produced.

15. The method of claim 14, further comprising performing steps a) through k) in real-time during operation of a system comprising said airfoil; and then providing updated values of the PID controller gain constants, $K_I$, $K_P$, and $K_D$ to a PID controller unit that supplies signals in real-time to an actuator coupled to the airfoil, that generates opposing feedback control forces, $\mu$, on the airfoil according to the following equation:

$$I\ddot{\alpha}+K\alpha+K_{NL}\alpha^3=-C\dot{\alpha}-C_{NL}\sin(\dot{\alpha})+\mu+M_\alpha(\alpha)+M(\dot{\alpha},\alpha)$$

where $$\mu=-K_P\alpha-K_I\int_0^t\alpha d\tau-K_D\dot{\alpha}.$$

16. The method of claim 9, wherein the numerical integration step uses a fixed time-step, $4^{th}$ order Runge-Kutta solution technique.

17. The method of claim 9, wherein the torsional stiffness, K, is selected to represent the torsional modulus of elasticity of a long blade or wing having said airfoil shape.

* * * * *